(12) United States Patent
Bonwick

(10) Patent No.: US 8,464,095 B1
(45) Date of Patent: Jun. 11, 2013

(54) METHOD AND SYSTEM FOR MULTI-DIMENSIONAL RAID RECONSTRUCTION AND DEFECT AVOIDANCE

(71) Applicant: Jeffrey S. Bonwick, Los Altos, CA (US)

(72) Inventor: Jeffrey S. Bonwick, Los Altos, CA (US)

(73) Assignee: DSSD, Inc., Menlo Park, CA (US)

( * ) Notice: Subject to any disclaimer, the term of this patent is extended or adjusted under 35 U.S.C. 154(b) by 0 days.

(21) Appl. No.: 13/677,623

(22) Filed: Nov. 15, 2012

(51) Int. Cl.
*G06F 11/00* (2006.01)

(52) U.S. Cl.
USPC ........................................................ 714/6.2

(58) Field of Classification Search
USPC ............... 714/6.1, 6.11, 6.12, 6.13, 6.2, 6.21, 714/6.22, 6.23, 6.24, 6.3, 41, 42
See application file for complete search history.

(56) References Cited

U.S. PATENT DOCUMENTS

| | | | |
|---|---|---|---|
| 6,351,838 B1 | 2/2002 | Amelia | |
| 7,143,227 B2 * | 11/2006 | Maine | 710/306 |
| 7,389,396 B1 * | 6/2008 | Goel et al. | 711/167 |
| 7,398,418 B2 | 7/2008 | Soran et al. | |
| 7,406,621 B2 | 7/2008 | Lubbers et al. | |
| 7,536,508 B2 * | 5/2009 | Davies | 711/114 |
| 7,543,100 B2 | 6/2009 | Singhal et al. | |
| 7,752,389 B1 | 7/2010 | Fan | |
| 7,934,120 B2 | 4/2011 | Zohar et al. | |
| 8,078,906 B2 | 12/2011 | Yochai et al. | |
| 8,145,840 B2 | 3/2012 | Koul et al. | |
| 8,200,887 B2 | 6/2012 | Bennett | |
| 8,316,260 B1 * | 11/2012 | Bonwick | 714/6.24 |
| 8,327,185 B1 * | 12/2012 | Bonwick | 714/6.24 |
| 8,341,342 B1 * | 12/2012 | Bonwick et al. | 711/103 |
| 2005/0166083 A1 | 7/2005 | Frey et al. | |
| 2005/0223156 A1 | 10/2005 | Lubbers et al. | |
| 2006/0085594 A1 | 4/2006 | Roberson et al. | |
| 2007/0220309 A1 * | 9/2007 | Andre et al. | 714/6 |
| 2008/0168225 A1 | 7/2008 | O'Connor | |
| 2009/0187786 A1 | 7/2009 | Jones et al. | |
| 2010/0199125 A1 | 8/2010 | Reche | |
| 2012/0072768 A1 * | 3/2012 | Morris et al. | 714/6.2 |
| 2012/0079318 A1 | 3/2012 | Colgrove et al. | |
| 2012/0089778 A1 | 4/2012 | Au et al. | |
| 2012/0166712 A1 | 6/2012 | Lary | |

OTHER PUBLICATIONS

Anvin, H., "The mathematics of RAID-6", retrieved from the internet at http://www.cs.utk.edu/"plank/plank/papers/CS-96-332.html, Jan. 20, 2004 (9 pages).
Kazmi, A., "PCI Express™ Basics & Applications in Communication Systems," PCI-SIG Developers Conference, 2004 (50 pages).
Percival, D., "Multicast Over PCT Express®," PCI-SIG Developer's Conference Europe, 2009 (33 pages).
Huffman, A., NVM Express Revision 1.0b, Jul. 12, 2011 (126 pages).
Regula, J., Using Non-transparent Bridging in PCI Express Systems, Jun. 1, 2004 (1 pages).

* cited by examiner

Primary Examiner — Nadeem Iqbal
(74) Attorney, Agent, or Firm — Osha Liang LLP

(57) ABSTRACT

In general, embodiments of the invention relate to storing data by receiving a request to write data, in response the request, selecting a first RAID grid location in a RAID grid to write the data, determining a first physical address in persistent storage corresponding to the first RAID grid location, generating a first page comprising the data and first out-of-band (OOB), wherein the first OOB comprises a first grid geometry for the RAID grid, and a first stripe membership for the page within the RAID grid, and writing the first page to a first physical location in persistent storage corresponding to the first physical address.

20 Claims, 22 Drawing Sheets

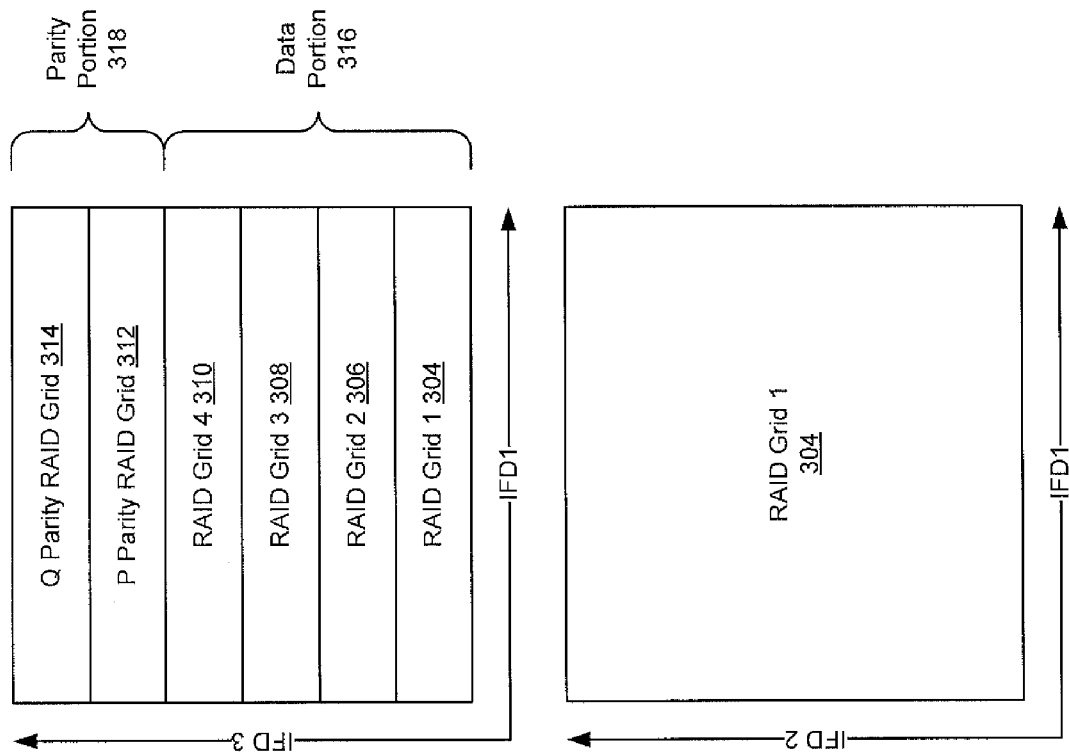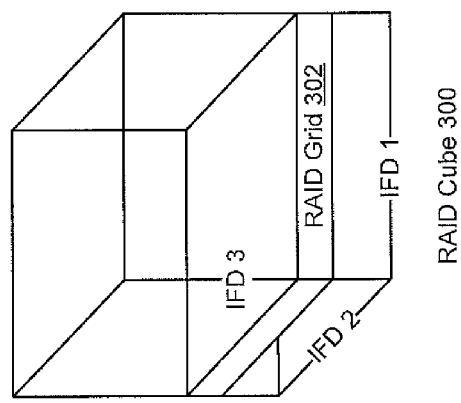
FIG. 3

|         |         |         |
|---------|---------|---------|
| <1,3,4> | <2,3,4> | <3,3,4> |
| <1,2,4> | <2,2,4> | <3,2,4> |
| <1,1,4> | <2,1,4> | <3,1,4> |

IFD 2 ↑    IFD 1 →

} P Parity RAID Grid 406

Value for <1,1,4> RAID gird location =
*f* (value at <1,1,1>, value at <1,1,2>, value at <1,1,3>)

|         |         |         |
|---------|---------|---------|
| <1,3,5> | <2,3,5> | <3,3,5> |
| <1,2,5> | <2,2,5> | <3,2,5> |
| <1,1,5> | <2,1,5> | <3,1,5> |

IFD 2 ↑    IFD 1 →

} Q Parity RAID Grid 408

Value for <1,1,5> RAID gird location =
*f* (value at <1,1,1>, value at <1,1,2>, value at <1,1,3>)

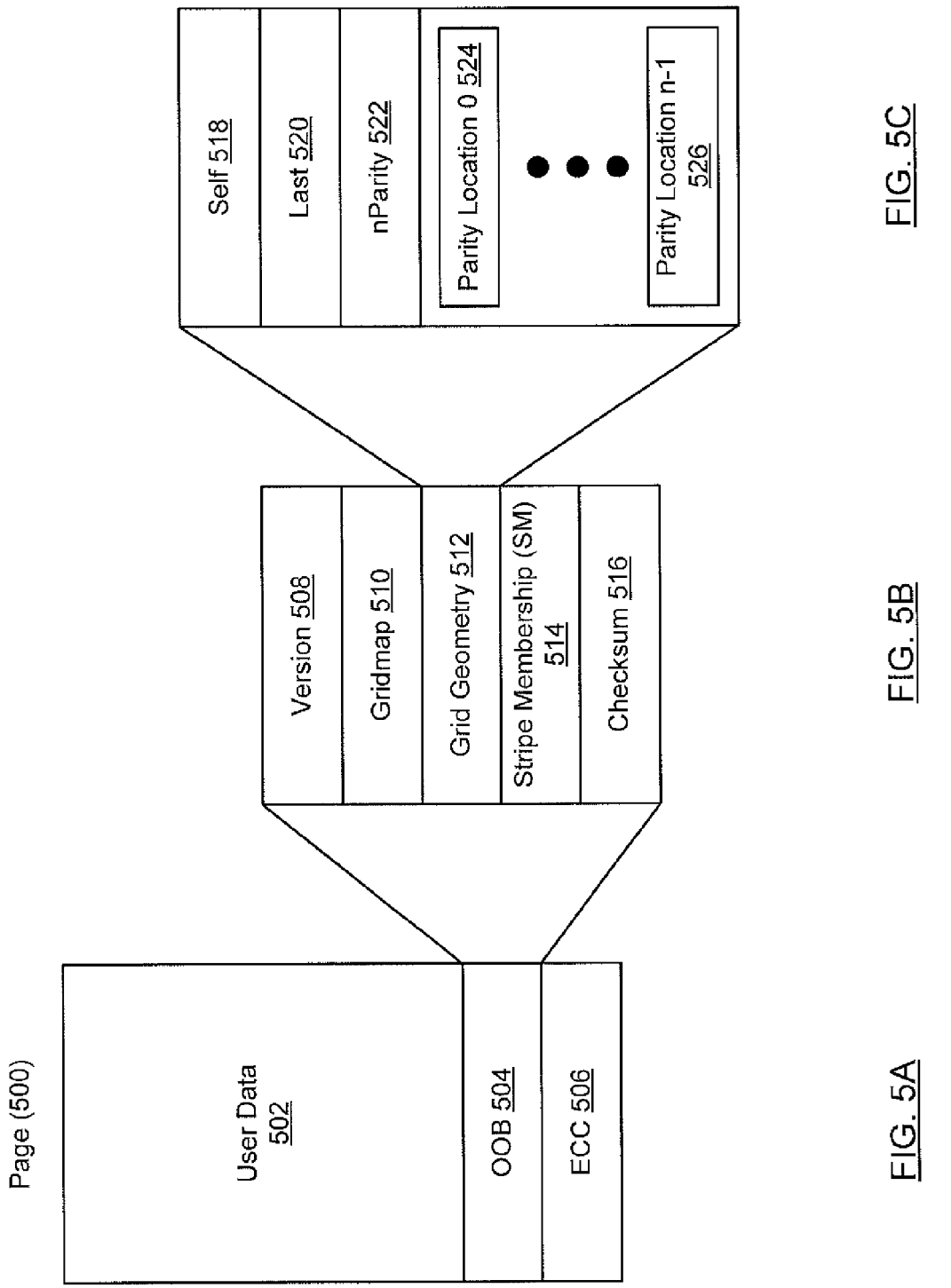

US 8,464,095 B1

METHOD AND SYSTEM FOR MULTI-DIMENSIONAL RAID RECONSTRUCTION AND DEFECT AVOIDANCE

BACKGROUND

In order to protect against potential loss of data in a storage system, it is often advantageous to implement a replication scheme. Current replication schemes are only able to sustain a limited amount of error before data within the storage system is unable to be read.

SUMMARY

In general, in one aspect, the invention relates to a method for storing data. The method comprises receiving a request to write data, in response the request, selecting a first RAID grid location in a RAID grid to write the data, determining a first physical address in persistent storage corresponding to the first RAID grid location, generating a first page comprising the data and first out-of-band (OOB), wherein the first OOB comprises a first grid geometry for the RAID grid, and a first stripe membership for the page within the RAID grid, and writing the first page to a first physical location in persistent storage corresponding to the first physical address.

In general, in one aspect, the invention relates to a method for reconstructing data. The method comprises receiving a request for first data, obtaining the first page comprising the data, wherein the first page is obtained from a first physical location in persistent storage and wherein the first physical location is associated with a first physical address and a first RAID grid location in a RAID grid, making a determination that the first page is one selected from a group consisting of corrupted and not obtained, based on the determination, identifying a neighbor RAID grid location of the first RAID grid location in the RAID grid, wherein the RAID grid comprises a row, wherein the first RAID grid location and the neighbor grid location are in the row, obtaining a second page from the neighbor RAID grid location, obtaining out-of-band (OOB) data from the second page, wherein the OOB comprises a gridmap for the RAID grid, grid geometry for the RAID grid, and stripe membership for the second page within the RAID grid, identifying RAID grid locations within the row comprising data pages using the grid geometry and the stripe membership, obtaining the data pages within the row using the gridmap and the grid geometry, identifying a RAID grid location in the row comprising a parity value using the grid geometry and the stripe membership, obtaining the parity value within the row using the gridmap and the grid geometry, reconstructing the first page using the data pages and the parity value to obtain a reconstructed page, obtaining the data from the constructed page, and providing the reconstructed data to the client.

Other aspects of the invention will be apparent from the following description and the appended claims.

BRIEF DESCRIPTION OF DRAWINGS

FIG. 3 shows a RAID cube and various views of the RAID cube in accordance with one embodiment of the invention.

FIGS. 5A-5C show a page in accordance with one or more embodiments of the invention.

DETAILED DESCRIPTION

Figure 1:
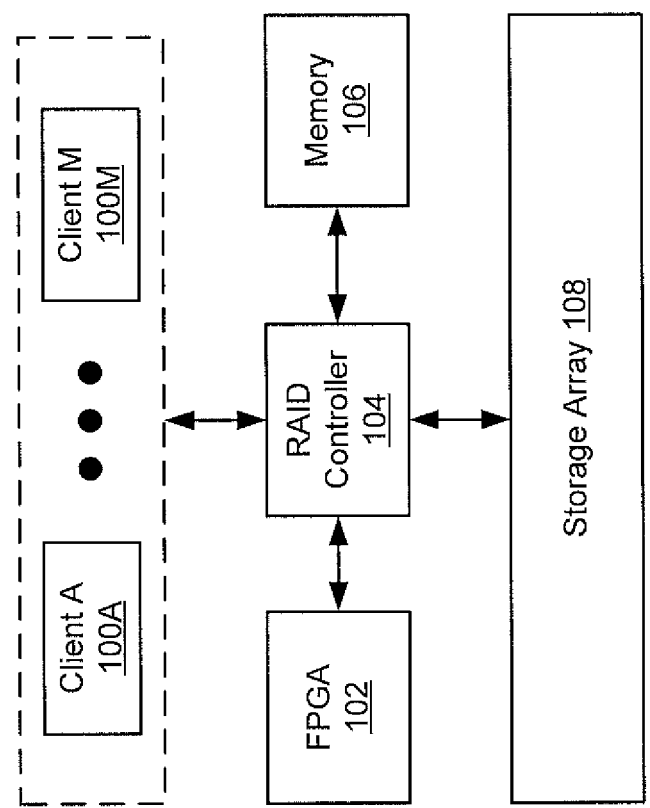
FIG. 1 shows a system in accordance with one embodiment of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-11D, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for replicating data using a multi-dimensional RAID scheme. More specifically, embodiments of the invention provide a method and system for implementing a 2D RAID scheme and a 3D RAID scheme. Further, embodiments of the invention relate to storing out-of-band (OOB) data in each page within a RAID grid and using the OOB to reconstruct pages within the RAID grid. In addition, embodiments of the invention relate to selecting the locations in the RAID grid in which to store parity values, where such selection is based, in part, on whether or not the underlying physical storage locations are bad (or otherwise cannot be written to).

Using a 2D RAID scheme, the data stored within a RAID grid implementing such a RAID scheme may be recovered when there are more than two errors in a given RAID stripe. Similarly, using a 3D RAID scheme, the data stored within a RAID cube implementing such a RAID scheme may be recovered when there are more than two errors in a given RAID stripe. Further, in various embodiments of the invention, all data may be recovered when there is a failure in more than one independent fault domain (IFD).

In one or more embodiments of the invention, an IFD corresponds to a failure mode which results in the data at a given location being inaccessible. Each IFD corresponds to an independent mode of failure in the storage array. For example, if the data is stored in NAND flash, where the NAND flash is part of a storage module (which may also be referred to in some embodiments as a flash module) (which includes multiple NAND dies), then the IFDs may be (i) storage module, (ii) channel (i.e., the channel used by the flash controller (not shown) in the storage module to write data to the NAND flash), and (iii) NAND die.

Figure 6:
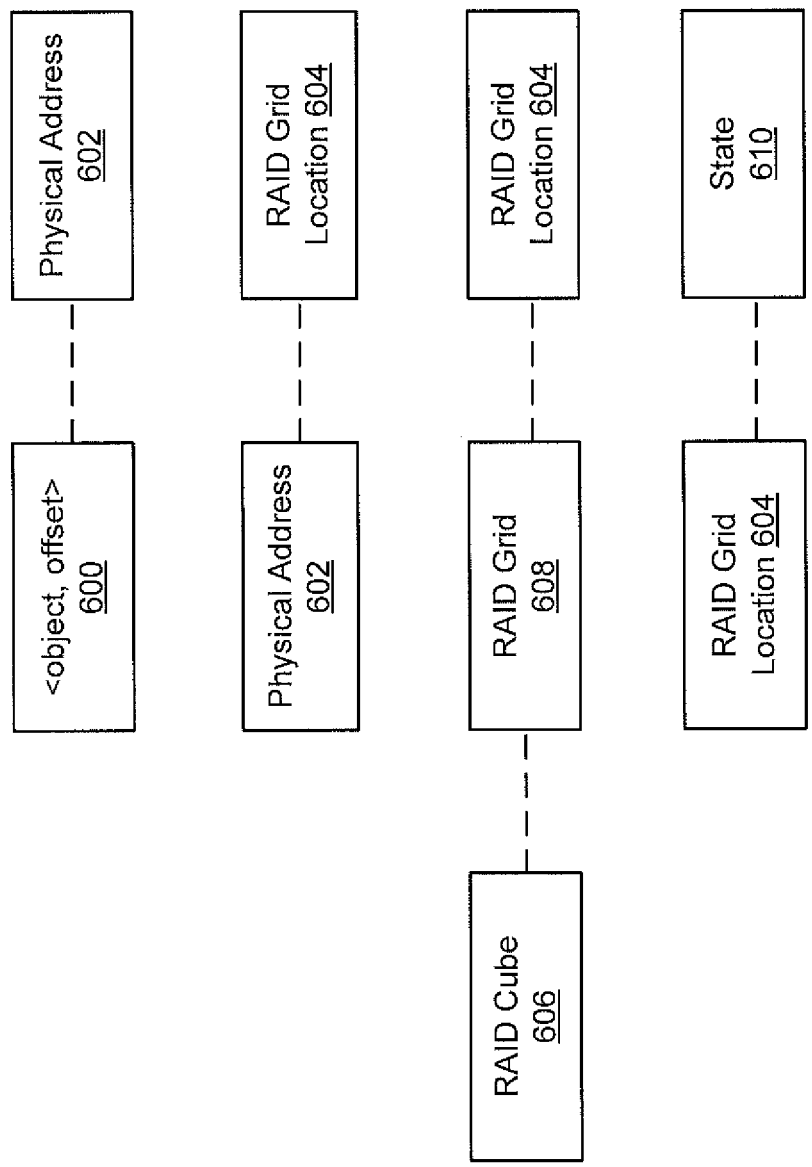
FIG. 6 shows data structures in accordance with one embodiment of the invention.

For purposes of this invention, the term "RAID" as used herein refers to "Redundant Array of Independent Disks." While "RAID" refers to any array of independent disks, embodiments of the invention may be implemented using any type of persistent storage device where the RAID grid locations (see e.g., FIG. 2) may be distributed across one or more persistent storage devices based on the implementation of the invention (see e.g., FIGS. 1 and 6).

In one or more embodiments of the invention, storing OOB in each page within the RAID grid enables pages within the RAID grid to be reconstructed using data stored within the RAID grid instead of relying on other external data structures. In particular, the OOB in a given page includes sufficient information to enable reconstruction of pages in the stripe(s) in which the given page is located. Further, various parts of the OOB are replicated across all pages in the RAID grid and, as such, the OOB information may be used to enable reconstruction of significant portions of the RAID grid without requiring additional external data structures. Because the OOB is co-located with the user data (defined below) that it describes, reconstruction of pages within the RAID grid may be readily offloaded to a processor other than the RAID controller.

FIG. 1 shows a system in accordance with one embodiment of the invention. As shown in FIG. 1, the system includes one or more clients (100A, 100M), a RAID controller (104), memory (106), an FPGA (102) (which may be optionally present), and a storage array (108).

In one embodiment of the invention, a client (100A, 100M) is any system or process executing on a system that includes functionality to issue a read request or a write request to the RAID controller (104). In one embodiment of the invention, the clients (100A, 100M) may each include a processor (not shown), memory (not shown), and persistent storage (not shown). In one embodiment of the invention, the RAID controller (104) is configured to implement the multi-dimensional RAID scheme, which includes writing data to the storage array in a manner consistent with the multi-dimensional RAID scheme (see FIGS. 7A-7D) and reading data (including reconstructing data) from the storage array in a manner consistent with the multi-dimensional RAID scheme (see FIGS. 9A-9B). In one embodiment of the invention, the RAID controller (104) includes a processor configured to execute instructions to implement one or more embodiments of the invention, where the instructions are stored on a non-transitory computer readable medium (not shown) that is located within or that is operatively connected to the RAID controller (104). Alternatively, the RAID controller (104) may be implemented using hardware. Those skilled in the art will appreciate that the RAID controller (104) may be implemented using any combination of software and/or hardware.

In one embodiment of the invention, the RAID controller (104) is operatively connected to memory (106). The memory (106) may be any volatile memory or non-volatile memory including, but not limited to, Dynamic Random-Access Memory (DRAM), Synchronous DRAM, SDR SDRAM, and DDR SDRAM. In one embodiment of the invention, the memory (106) is configured to temporarily store various data (including parity data) prior to such data being stored in the storage array.

In one embodiment of the invention, the FPGA (102) (if present) includes functionality to calculate P and/or Q parity values for purposes of storing data in the storage array (108) and/or functionality to perform various calculations necessary to recover corrupted or missing data stored using the multi-dimensional RAID scheme. In one embodiment of invention, the FPGA may include functionality to perform the recovery of corrupted data using the OOB. The RAID controller (104) may use the FPGA (102) to offload the processing of various data in accordance with one or more embodiments of the invention.

In one embodiment of the invention, the storage array (108) includes a number of individual persistent storage devices including, but not limited to, magnetic memory devices, optical memory devices, solid state memory devices, phase change memory devices, any other suitable type of persistent memory device, or any combination thereof. In one embodiment of the invention, each storage array (108) may include a number of storage modules where each storage module includes solid state memory and a storage module controller. In such embodiments the storage module controller includes functionality to receive pages from the RAID controller and write the pages to the corresponding physical locations in the solid state memory. Further, the storage module controller may include functionality to generate the error-correcting codes (ECC) for each page prior to the page being written to the solid state memory. In addition, the storage module controller may include functionality to reconstruct pages in accordance with FIGS. 9A-9B.

Those skilled in the art will appreciate that while FIG. 1 shows an FPGA, the invention may be implemented without an FPGA. Further, those skilled in the art will appreciate that other components may be used in place of the FPGA without departing from the invention. For example, the invention may be implemented using an ASIC(s), a graphics processing unit(s) (GPU), a general purpose processor(s), any other hardware device capable of calculating P and/or Q parity values for purposes of storing data in the storage array and/or performing various calculations necessary to recover corrupted data stored using the multi-dimensional RAID scheme, any devices that includes a combination of hardware, firmware, and/or software configured to calculate P and/or Q parity values for purposes of storing data in the storage array (108) and/or to perform various calculations necessary to recover corrupted data stored using the multi-dimensional RAID scheme, or any combination thereof.

Figure 2:
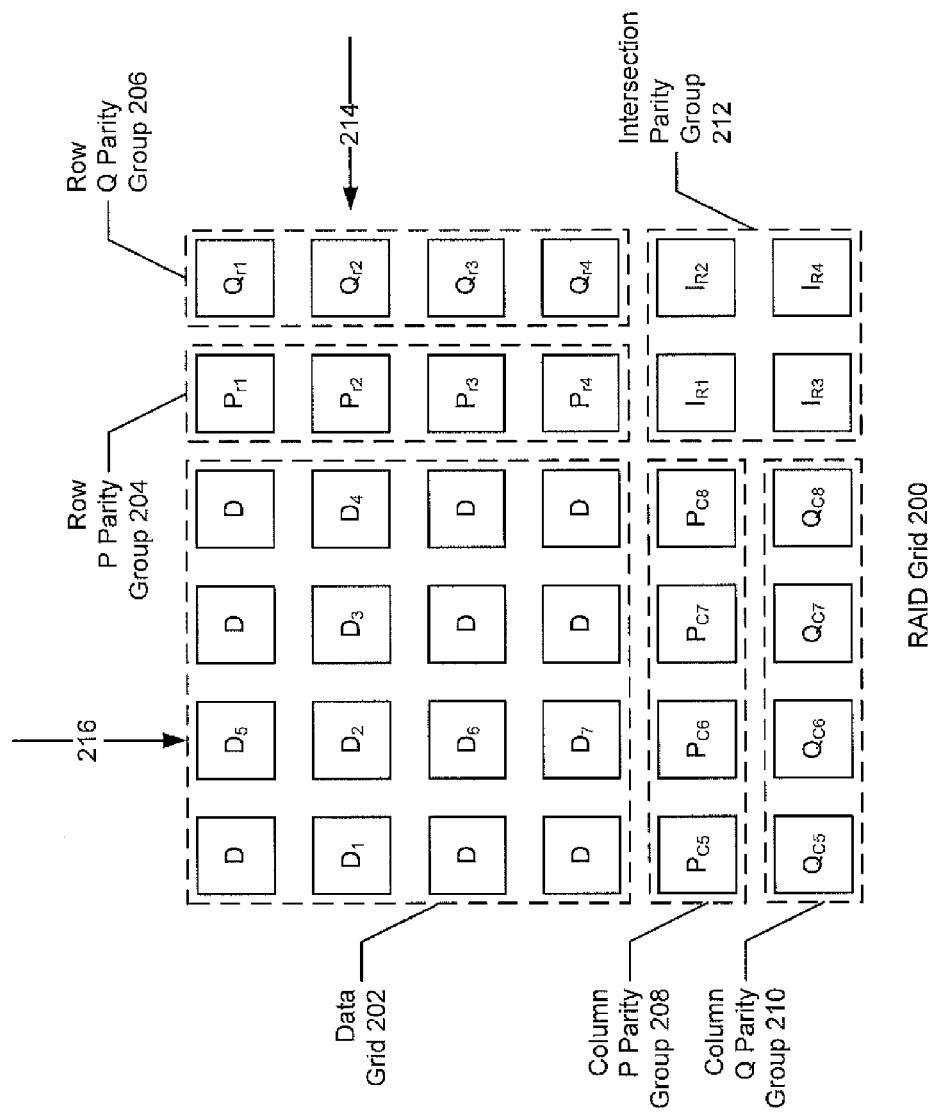
FIG. 2 shows a RAID grid in accordance with one embodiment of the invention.

FIG. 2 shows a RAID grid in accordance with one embodiment of the invention. In one embodiment of the invention, if the RAID controller implements a 2D RAID scheme or a 3D RAID scheme (see FIG. 3), the RAID controller stores data in a RAID Grid (200). FIG. 2 shows the conceptual portions of a RAID grid in accordance with one or more embodiments of the invention. The RAID grid (200) includes a number of RAID grid locations, where each RAID grid location is ultimately written to a unique physical address in the storage array. The RAID grid (200) includes (i) a data grid (202), which includes RAID grid locations that store data received from the client (i.e., data that the client has instructed the RAID controller to write to the storage array; (ii) a row P parity group (204), which includes the RAID grid locations that store in the P parity values calculated using data in RAID grid locations in a row (described below); (iii) a row Q parity group (206), which includes the RAID grid locations that store in the Q parity values calculated using data in RAID grid locations in a row (described below); (iv) a column P parity group (208), which includes the RAID grid locations that store in the P parity values calculated using data in RAID grid locations in a column (described below); (v) a column Q parity group (210), which includes the RAID grid locations that store in the Q parity values calculated using data in RAID grid locations in a column (described below); and (vi) an intersection parity group (212), which includes parity values calculated using (a) data from RAID grid locations in row P parity group (204), (b) data from RAID grid locations in row Q parity group (206), (c) data from RAID grid locations in column P parity group (208), and (d) data from RAID grid locations in column Q parity group (210) (described below).

Referring to row (214), in one embodiment of the invention, the data stored in RAID grid location denoted as $P_{r2}$ in row (214) is calculated by applying a P parity function to all RAID grid locations in the row (214) that include data (e.g., $P_{r2}=f_P(D_1, D_2, D_3, D_4)$. Similarly, in one embodiment of the invention, the data stored in RAID grid location denoted as $Q_{r2}$ in row (214) is calculated by applying a Q parity function to all RAID grid locations in the row (214) that include data (e.g., $Q_{r2}=f_Q(D_1, D_2, D_3, D_4)$.

Referring to column (216), in one embodiment of the invention, data stored in the RAID grid location denoted as $P_{c6}$ in column (216) is calculated by applying a P parity function to all RAID grid locations in the column (216) that include data (e.g., $P_{c6}=f_P(D_5, D_2, D_6, D_7)$. Similarly, in one embodiment of the invention, data stored in the RAID grid location denotes by $Q_{C6}$ in column (216) is calculated by applying a Q parity function to all RAID grid locations in the column (216) that include data (e.g., $Q_{c6}=f_Q(D_5, D_2, D_6, D_7)$.

Referring to the intersection parity group (212), in one embodiment of the invention, the data stored in the RAID grid location denoted as $I_{r1}$ may be calculated by applying a P parity function to all RAID grid locations in the row P Parity Group (204) or by applying a P parity function to all RAID grid locations in the column P Parity Group (208). For example, $I_{r1}=f_P(P_{r1}, P_{r2}, P_{r3}, P_{r4})$ or $I_{r1}=f_P(P_{c5}, P_{c6}, P_{c7}, P_{c8})$.

In one embodiment of the invention, the data stored in the RAID grid location denoted as $I_{r2}$ may be calculated by applying a P parity function to all RAID grid locations in the row Q Parity Group (204) or by applying a Q parity function to all RAID grid locations in the column P Parity Group (208). For example, $I_{r2}=f_P(Q_{r1}, Q_{r2}, Q_{r3}, Q_{r4})$ or $I_{r2}=f_Q(P_{c5}, P_{c6}, P_{c7}, P_{c8})$.

In one embodiment of the invention, the data stored in the RAID grid location denoted as $I_{r3}$ may be calculated by applying a P parity function to all RAID grid locations in the column Q Parity Group (210) or by applying a Q parity function to all RAID grid locations in the row P Parity Group (204). For example, $I_{r3}=f_P(Q_{c5}, Q_{c6}, Q_{c7}, Q_{c8})$ or $I_{r3}=f_Q(P_{c1}, P_{c2}, P_{c3}, P_{c4})$.

In one embodiment of the invention, the data stored in the RAID grid location denoted as $I_{r4}$ may be calculated by applying a Q parity function to all RAID grid locations in the column Q Parity Group (210) or by applying a Q parity function to all RAID grid locations in the row Q Parity Group (206). For example, $I_{r4}=f_Q(Q_{c1}, Q_{c2}, Q_{c3}, Q_{c4})$ or $I_{r4}=f_Q(Q_{c5}, Q_{c6}, Q_{c7}, Q_{c8})$.

In one embodiment of the invention, the P and Q parity functions used to calculate the values for all of the parity groups may correspond to any P and Q parity functions used to implement RAID 6.

As discussed above, the RAID grid (200) shown in FIG. 2 represents the conceptual layout of a RAID grid. However, when the individual RAID grid locations are written to the storage array, the relative location of the various RAID grid locations may vary across a row and/or a column. For example, referring to row (214), when the RAID grid locations within row (214) are written to the storage array, the relative location of RAID grid locations that include data (denoted by "D") and the RAID grid locations that include parity data (i.e., the RAID grid locations denoted as "$P_r$" and "$Q_r$") may be as follows: <$D_1, D_2 P_{r2}, D_3 Q_{r2}, D_4$>, <$P_{r2}, Q_{r2}, D_1, D_2, D_3, D_4$>, or any other arrangement within row (214). Similarly, referring to column (216), the relative location of RAID grid locations that include data (denoted by "D") and the RAID grid locations that include parity data (i.e., the RAID grid locations denoted as "$P_c$" and "$Q_c$") may be as follows: <$D_5, D_2, D_6, P_{c6}, D_6, Q_{c6}$>, <$P_6, D_5, D_2, Q_{c6}, D_6, D_7$>, Or any other arrangement within column (216).

Figure 7A:
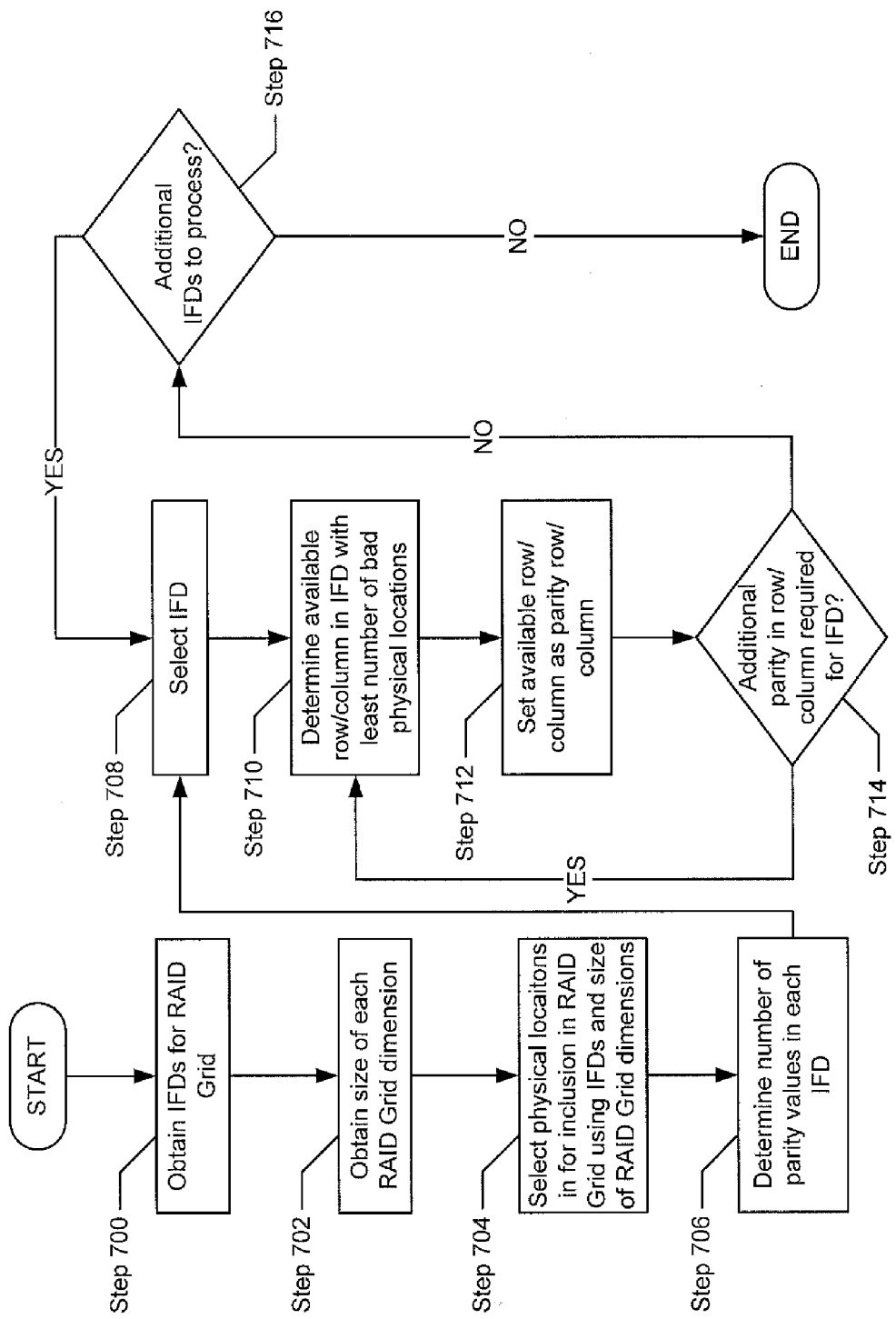
FIGS. 7A-7D show flow charts in accordance with one embodiment of the invention.

In one embodiment of the invention, the location of each of (i) the row P parity group, (ii) the row Q parity group, (iii) the column P parity group, and (iv) the column Q parity group is determined in accordance with the method shown in FIG. 7A. In such embodiments, the location of the intersection parity group is determined based on the locations of the aforementioned parity groups (See FIG. 8A).

Continuing with the discussion of FIG. 2, the RAID controller (or another entity in the system) may determine to which physical addresses in the storage array each of the RAID grid locations is written. This determination may be made prior to receiving any of the data (denoted as "D") for a particular RAID grid from the client. Alternatively, the determination may be made prior to writing the RAID grid locations to the storage array.

Those skilled in the art will appreciate that while FIG. 2 shows a RAID grid that is 6×6, the RAID grid may be implemented using any other dimensions without departing from the invention.

In one embodiment of the invention, the P parity value is a Reed-Solomon syndrome and, as such, the P Parity function may correspond to any function that can generate a Reed-Solomon syndrome. In one embodiment of the invention, the P parity function is an XOR function.

In one embodiment of the invention, the Q parity value is a Reed-Solomon syndrome and, as such, the Q Parity function may correspond to any function that can generate a Reed-Solomon syndrome. In one embodiment of the invention, a Q parity value is a Reed-Solomon code. In one embodiment of the invention, $Q=g^0 \cdot D_0+g^1 \cdot D_1+g^2 \cdot D_2+ \ldots +g^{n-1} \cdot D_{n-1}$, where Q corresponds any one of the Q parity values defined with respect to FIG. 2, g is a generator of the field, and the value of D corresponds to the data (which may include both values from the data grid and/or values from one or more rows or columns that include P or Q parity values).

Those skilled in the art will appreciate that while the RAID grid in FIG. 2 includes P and Q parity for each row and column, embodiments of the invention may be implemented using greater or fewer parity values without departing from the invention. For example, each row and column may only include a P parity value. In another example, each row and column may include three parity values. The aforementioned examples are not intended to limit the invention. In one embodiment of the invention, regardless of the number of parity values used in the implementation of the invention, each of the parity values is a Reed-Solomon syndrome.

FIG. 3 shows a RAID cube and various views of the RAID cube in accordance with one embodiment of the invention. As shown in FIG. 3, a RAID cube (300) corresponds to a conceptual stack of RAID grids (302). As discussed above, the RAID controller (or another entity in the system) selects the physical addresses within the storage array in which to store the data for each of the RAID grid locations. In one embodiment of the invention, the selection of the physical addresses may be determined in accordance with the IFDs for which the RAID grid (or RAID cube) is designed to protect against. Said another way, the physical addresses may be selected in a manner to protect against failures in one or more IFDs. For example, as shown in FIG. 3, each RAID grid location (not shown) for a given RAID grid (302, 304) is written to a physical address (or will be written to a physical address) in the storage array (not shown) that is selected using a unique pair of values from IFD 1 and IFD 2, but has the same value for IFD 3. For example, if the data in the storage array is stored in NAND flash, where the NAND flash is part of a storage module (which includes multiple NAND dies), then the IFDs may be as follows: (i) IFD 1=storage module, (ii) IFD 1=channel, and (iii) IFD 3=NAND die. Accordingly, in a given RAID grid, the data in each RAID grid location is written to a unique combination of storage module (IFD 1) and channel (IFD 2) but is written to the same NAND die (on each of the storage modules). Those skilled in the art will appreciate that the invention is not limited to the three independent fault domains described above. Further, those skilled in the art will appreciate that the invention is not limited to a storage array that includes NAND flash.

Continuing with FIG. 3, as discussed above, the RAID cube (300) is conceptual stack of RAID grids. More specifically, in one embodiment of the invention, the RAID cube (300) may include (i) a data portion (316), which includes two or more RAID grids (304, 306, 308, 310) (see FIG. 2) and a parity portion (318) that includes a P parity RAID grid (312) and a Q parity RAID grid (314).

In one embodiment of the invention, the RAID grids (304, 306, 308, 310) in the data portion (316) include parity data (see FIG. 2), which allows data within the RAID grid to be recovered using only data (including parity data) within the RAID grid. In one embodiment of the invention, the RAID cube is arranged such that data for a given RAID grid location in a given RAID grid (304, 306, 308, 310) may be recovered using data (including parity data) from other RAID grids (in both the data portion (316) and the parity portion (318). In one embodiment of the invention, the parity portion (318) of the RAID cube enables such a recovery mechanism.

In one embodiment of the invention, the P parity RAID grid (312) is the same dimension as the underlying RAID grids (304, 306, 308, 310), where the data in every RAID grid location within the P Parity RAID grid is calculated by applying a P parity function (e.g., an XOR function) to data (including parity data) from the RAID grids in the data portion (316) (see FIGS. 4A-4D) Similarly, the Q parity RAID grid (314) is the same dimension as the underlying RAID grids (304, 306, 308, 310), where the data in every RAID grid location within the Q Parity RAID grid is calculated by applying a Q parity function to data (including parity data) from the RAID grids in the data portion (316) (see FIGS. 4A-4D).

FIGS. 4A-4D show an example of populating a RAID cube in accordance with one or more embodiments of the invention. The example is not intended to limit the scope of the invention.

Figure 4A:
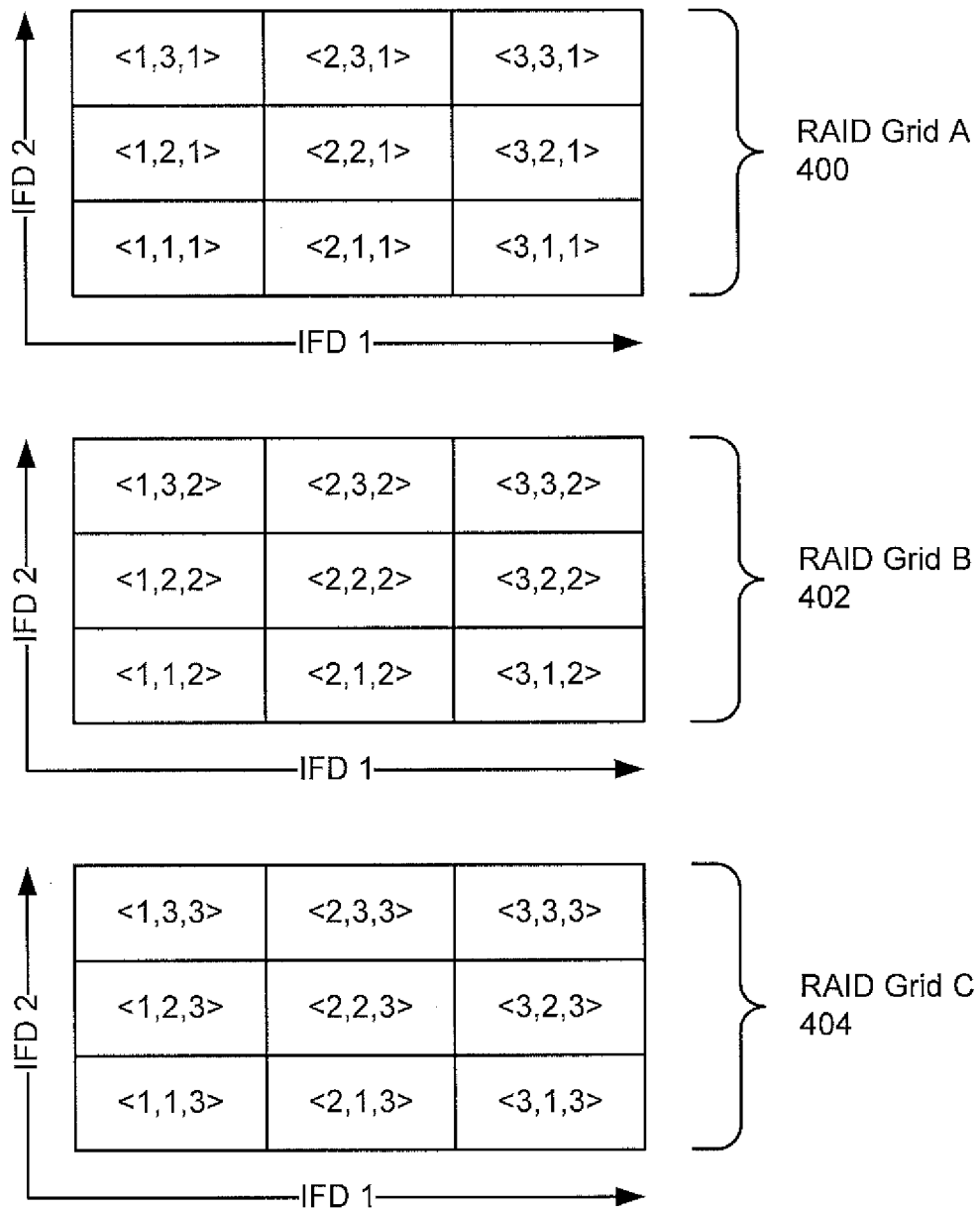
FIGS. 4A-4D show an example of a RAID cube in accordance with one or more embodiments of the invention.
Figures 4B, 4C, 4D:
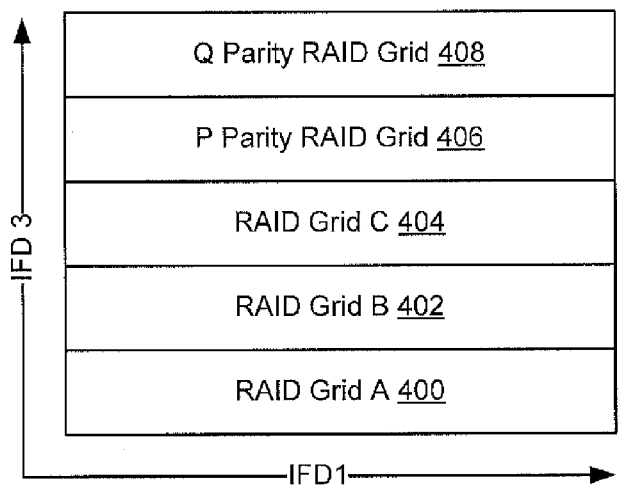

Consider the RAID cube depicted in FIG. 4D, which includes RAID grid A (400) RAID grid B (402), RAID grid C (404), P parity RAID grid (406), and Q parity RAID grid (408). Further, each RAID grid (400, 402, 404, 406, 408) in the RAID cube includes RAID grid locations that are written across IFD 1 and IFD 2 but have a constant value of IFD 3. Accordingly, in one embodiment of the invention, the value of a RAID grid location (the "target RAID grid location") in a RAID grid may be recovered using (i) only values of RAID grid locations in the row or column in which the target RAID grid location is located; (ii) using values of any RAID grid location within the RAID grid in which the target RAID grid location is located; or (iii) using values of any RAID grid location within the RAID cube in which the target RAID grid location is located. Said another way, in one embodiment of the invention, the arrangement of the data and parity values within the RAID grid and/or RAID cube allows the value in a target RAID grid location to be recovered when there are more than two errors in each of the row and column in which the target RAID grid location is located.

Referring to FIG. 4A, FIG. 4A includes three RAID grids (400, 402, 404), which make up the data portion of the RAID cube. Each of the RAID grid locations in each of the RAID grids (400, 402, 404) includes a 3-tuple defining the location in the storage array in which the data in the RAID grid location is written. In this example, the elements in the 3-tuple correspond to IFDs as follow: <IFD1, IFD2, IFD3>. The 3-tuples illustrates how the locations in the storage array are selected across the various IFDs. In particular, each of the RAID grid locations in RAID grid A includes a unique combination of IFD1 and IFD2, but the same value for IFD3. For example, if IFD1 is a storage module, IFD2 is a channel, and IFD3 is a NAND die, then 3-tuple <4, 2, 1> indicates that the data in the particular RAID grid location will be written to a physical address in NAND die 1 in Storage module 4 using Channel 2. Similarly, the 3-tuple <2, 3, 1> indicates that the data in the particular RAID grid location will be written to a physical address in NAND 1 in Storage module 2 using Channel 3.

RAID grid B (402) and RAID grid C (404) are arranged in a similar manner to RAID grid A (400). However, the value for IFD3 in the 3-tuples for RAID grid locations in RAID grid B (402) is different than the value of IFD3 in the 3-tuples for RAID grid locations for RAID grid A (400). Further, the value for IFD3 in the 3-tuples for RAID grid locations for RAID grid C (404) is different than the value of IFD3 in the 3-tuples for RAID grid locations for RAID grid A (400) and for RAID grid B (402).

Referring to FIG. 4B, data in each of the RAID grid locations in P Parity RAID grid (406) are arranged in a similar manner to RAID grid A (400), RAID grid B (402), and RAID grid C (404). Further, as described above, the value of the data in each of the RAID grid locations in P Parity RAID grid (406) is calculated using data from one RAID grid location in each of the data grids in the RAID cube (i.e., RAID grid A (400), RAID grid B (402), RAID grid C (404)). For example, the value of the data at RAID grid location <1, 1, 4> in the P Parity RAID grid (406) is determined by applying a P parity function (e.g., an XOR function) to data from the following RAID grid locations: (i) data from RAID grid A (400)<1,1,1>, (ii) data from RAID grid B (402)<1,1,2>, and (iii) data from RAID grid C (404)<1,1,3>. The values for data in the other RAID grid locations in P Parity RAID grid (406) are calculated in a similar manner.

Referring to FIG. 4C, data in each of the RAID grid locations in Q Parity RAID grid (408) are arranged in a similar manner to RAID grid A (400), RAID grid B (402), and RAID grid C (404). Further, as described above, the value of the data in each of the RAID grid locations in Q Parity RAID grid (408) is calculated using data from one RAID grid location in each of the data grids in the RAID cube (i.e., RAID grid A (400), RAID grid B (402), RAID grid C (404)). For example, the value of the data at RAID grid location <1, 1, 5> in the Q Parity RAID grid (408) is determined by applying a Q parity function (as described above) to data from the following RAID grid locations: (i) data from RAID grid A (400)<1,1,1>, (ii) data from RAID grid B (402)<1,1,2>, and (iii) data from RAID grid C (404)<1,1,3>. The values for data in the other RAID grid locations in Q Parity RAID grid (408) are calculated in a similar manner.

FIGS. 5A-5C show a page in accordance with one or more embodiments of the invention. In one embodiment of the invention, each RAID location in a RAID grid (see FIGS. 2, 3, 4A-4D) is configured to store a page (500). Referring to FIG. 5A, the page (500) includes user data (502), out-of-band (OOB) data (504), and error-correcting codes (ECC)(506). In one embodiment of the invention, user data (502) corresponds to any data received from a client and any data derived directly or indirectly from data received from a client. For example, the user data may include (i) P and Q parity values, which are derived directly from data received from a client and (ii) intersection parity values (see FIG. 2, 212) which are derived from the aforementioned P and/or Q parity values.

In one embodiment of the invention, OOB (504) corresponds to data that provides information about the RAID grid (i.e., the RAID grid in which the page that includes the OOB is stored) as well as information about the page (500) that includes the OOB (504). Additional detail about the OOB (504) is described in FIG. 5B.

In one embodiment of the invention, the ECC (506) is generated for the combination of the user data (502) and the OOB (504). Accordingly, the ECC (506) may be used to identify and potentially correct errors in the user data (502) and OOB (504). In one embodiment of the invention, the ECC may be calculated using any type of error-correcting code without departing from the invention. Depending on the type of ECC used, the ECC may only be able to detect errors but not necessarily correct the errors in the user data and OOB (504).

FIG. 5B shows an OOB (504) for the page (500) in accordance with one or more embodiments of the invention. As shown in FIG. 5B, the OOB (504) includes: (i) a version (508) field, (ii) a gridmap (510), (iii) grid geometry (512), (iv) stripe membership (SM) (514), and (v) a checksum (516). Each of these components is described below.

In one embodiment of the invention, the version (508) field specifies the version of the OOB format for the OOB. In one embodiment of the invention, this version (508) field is included to ensure that entity using the OOB to reconstruct a page (see FIGS. 9A-9B) understands to what each piece of data in the OOB refers. In one embodiment of the invention, the version (508) field is represented using an integer.

In one embodiment of the invention, the gridmap (510) specifies the independent fault domains associated with each dimension in the RAID grid in which the page (500) is located. For example, if the first IFD is a storage module and the second IFD is channel, then the gridmap (510) encodes this information into a bitmap.

In one embodiment of the invention, the grid geometry (512) specifies information about the geometry of the RAID grid as well as the location of the page (500) in the RAID grid. Additional details about the grid geometry (512) are described in FIG. 5C.

In one embodiment of the invention, the SM (514) includes a bitmap for each dimension in which the page (500) is included. Accordingly, if the page (500) is included in a RAID grid, then the SM includes two bitmaps—one for each dimension. Further, if the page (500) is included in a RAID cube, then the SM includes three bit-maps—one for each dimension. Each bitmap in the SM identifies the bad physical locations within the stripe for that dimension. More specifically, each RAID grid location in the RAID grid is associated with an physical location in the persistent storage. If a page is unable to be written to the particular physical location (e.g., due to a physical defect in the fabrication of the persistent storage), then the physical location is designated as a bad physical location. In one embodiment of the invention, the bad physical locations are designated with a "0" and all other physical locations in the stripe are designated with a "1." Other bitmap encoding schemes may be used without departing from the invention.

In one embodiment of the invention, the checksum (516) corresponds to a checksum of all other data in the OOB (e.g., version field, gridmap, grid geometry, and SM) and is used to ensure the integrity of the data in the OOB. In one embodiment of the invention, the checksum may be calculated using any appropriate checksum function (e.g., SHA-1, MD5, SHA-256) without departing from the invention.

Referring to FIG. 5C, the grid geometry (512) includes: (i) a self (518) field, (ii) a last (520) field, (iii) an nparity (522) field, and (iv) one or more parity locations (524, 526). Each of these components is described below.

In one embodiment of the invention, the self (518) field includes a location of the page (500) within the RAID grid. In one embodiment of the invention, the location is a represented as a tuple, where each entry in the tuple corresponds to a location in a given IFD. (see FIG. 8B, Self). In one embodiment of the invention, the location in the self (518) field is a relative location. The relative location is specified with respect to a reference RAID grid location in the RAID grid. In one embodiment of the invention, the reference RAID grid location is a first RAID grid location in the RAID grid (see FIG. 8A, 814).

In one embodiment of the invention, the last (520) field specifies the last column and row number of the RAID grid. For example, referring to FIG. 8A, the RAID grid (800) is a 6×6 grid—accordingly, the last (520) field would specify <5, 5> (because the numbering starts at zero).

In one embodiment of the invention, the nparity (522) field specifies the number of parity values in each dimension of the RAID grid. For example, if P parity and Q parity is calculated in a given dimension, then the nparity (522) field will include "2" for that dimension.

In one embodiment of the invention, the grid geometry includes one parity location (524, 526) for each type of parity in each dimension. For example, if the RAID grid includes P and Q parity in both dimensions, then the grid geometry would include parity locations of the P parity row group, the Q parity row group, the P parity column group, and the Q parity column group. In one embodiment of the invention, the parity locations are specified on a per parity-type (see e.g., FIG. 8B, P, Q) on a per dimension basis (e.g., row and column).

In one embodiment of the invention, the version (508), the gridmap (510), the last (520) field, nparity (522) field, and the parity locations (524, 526) are the same in each page (500) within a RAID grid. In one embodiment of the invention, this replication ensures that every readable grid location in a stripe has all the information necessary to enable recovery of any grid location within the stripe.

Those skilled in the art will appreciate that while FIGS. 5A-5C describe the OOB for a page in a 2D RAID scheme (e.g., a RAID grid), the OOB (504) may include information for a n-dimensional RAID scheme without departing from the invention. Further, those skilled in the art will appreciate that embodiments of the invention may be implemented using greater (e.g., using P, Q, and R parity) or fewer parity values (e.g., using P parity) without departing from the invention.

While FIGS. 5A-5C show various types of data stored in a page, embodiments of the invention may be implemented with pages that include additional (or different) data and/or a different ordering of data without departing from the invention. Further, the values in the various fields within the OOB may be encoded using any encoding scheme without departing from the invention.

FIG. 6 shows data structures in accordance with one embodiment of the invention. In one embodiment of the invention, the RAID controller includes one or more data structures to implement the multi-dimensional RAID schemes.

In one embodiment of the invention, the RAID controller includes a data structure that tracks the mappings between data provided by the client and the physical address of such data in the storage array. In one embodiment of the invention, the RAID controller tracks the aforementioned information using a mapping between a logical address e.g., <object, offset> (600), which identifies the data from the perspective of the client, and a physical address (602), which identifies the location of the data within the storage array. In one embodiment of the invention, the mapping may be between a hash value derived from applying a hash function (e.g., MD5, SHA 1) to <object, offset> and the corresponding physical address (602). Those skilled in the art will appreciate that any form of logical address may be used without departing from the invention.

In one embodiment of the invention, the RAID controller includes a data structure that tracks how each RAID grid location (604) (see FIG. 2) is mapped to a particular physical address (602) in the storage array.

In one embodiment of the invention, the RAID controller includes a data structure that tracks which RAID grid (including RAID grids in the data portion and the parity portion) (608) is associated with which RAID cube (606) (assuming that the RAID controller is implementing a 3D RAID scheme) and also which RAID grid locations (604) are associated with each RAID grid (608).

In one embodiment of the invention, the RAID controller includes a data structure that tracks the state (610) of each RAID grid location (604). In one embodiment of the invention, the state (610) of a RAID grid location may be set as filled (denoting that page has been written to the RAID grid location) or empty (denoting that nothing has been written to the RAID grid location). In one embodiment of the invention, the RAID controller may also set the state of the RAID grid location to filled if the RAID controller has identified data to write to the RAID grid location (see FIG. 7B, Step 720). When the RAID grid is initially created (see FIG. 7A), the RAID controller may initially set the state of each RAID grid location to empty.

In one embodiment of the invention, the RAID controller includes a data structure that tracks the RAID grid geometry. In one embodiment of the invention, the RAID grid geometry may include, but is not limited to, the size of the RAID grid and the IFD associated with each dimension of the RAID grid. This data structure (or another data structure) may also track the size of the RAID cube and the IFD associated with each dimension of the RAID cube.

In one embodiment of the invention, the RAID controller includes a data structure that tracks the location of each P and Q parity value (including parity values within the intersection parity group (see FIG. 2)) within each row and/or column within each RAID grid.

In one embodiment of the invention, the RAID controller may include a data structure that tracks which RAID grid locations in the data portion of the RAID cube are used to calculate each of the P and Q parity values in the P Parity RAID grid and Q parity RAID grid, respectively.

FIGS. 7A-D show flowcharts in accordance with one or more embodiments of the invention. More specifically, FIGS. 7A-7D show a method for storing data in a storage array in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the methods shown in FIGS. 7A-7D may be performed in parallel.

Referring to FIG. 7A, FIG. 7A shows a method for setting up a RAID grid and selecting the location of the parity rows and columns within the RAID grid in accordance with one or more embodiments of the invention.

In step 700, the independent fault domains (IFDs) for the RAID grid are obtained. In one embodiment of the invention, the IFDs are selected from the elements that make up a physical address. For example, a physical address may be represented using the following tuple: <storage module (FM), channel (CH), chip enable (CE), LUN, plane, block, page, byte>. In this example, the IFD may be the FM, CH, CE, and/or LUN.

In step 702, the size of each dimension in the RAID grid is obtained. In one embodiment of the invention, the size of each dimension specifies the number of pages stored across each dimension. For example, in FIG. 2, the size of each dimension in RAID grid (200) is six. Those skilled in the art will appreciate that the sizes of each dimension do not need to be the same.

In step 704, physical locations in the persistent storage are selected for inclusion in the RAID grid based on the IFDs and the size of each dimension in the RAID grid. For example, if the RAID grid is 4×4, then 16 physical locations need to be selected (or otherwise identified) for the RAID grid. Further, if each physical location is defined by the following tuple: <FM, CH, CE, LUN, plane, block, page, byte> and the IFDs are FM and CH, then the physical locations for the RAID grid are denoted in Table 1.

TABLE 1

| Physical location number | Physical Address for each Physical Location |
| --- | --- |
| 1 | <FM, CH, CE, LUN, plane, block, page, byte> |
| 2 | <FM, CH + 1, CE, LUN, plane, block, page, byte> |
| 3 | <FM, CH + 2, CE, LUN, plane, block, page, byte> |
| 4 | <FM, CH + 3, CE, LUN, plane, block, page, byte> |
| 5 | <FM + 1, CH, CE, LUN, plane, block, page, byte> |
| 6 | <FM + 1, CH + 1, CE, LUN, plane, block, page, byte> |
| 7 | <FM + 1, CH + 2, CE, LUN, plane, block, page, byte> |
| 8 | <FM + 1, CH + 3, CE, LUN, plane, block, page, byte> |
| 9 | <FM + 2, CH, CE, LUN, plane, block, page, byte> |
| 10 | <FM + 2, CH + 1, CE, LUN, plane, block, page, byte> |
| 11 | <FM + 2, CH + 2, CE, LUN, plane, block, page, byte> |
| 12 | <FM + 2, CH + 3, CE, LUN, plane, block, page, byte> |
| 13 | <FM + 3, CH, CE, LUN, plane, block, page, byte> |
| 14 | <FM + 3, CH + 1, CE, LUN, plane, block, page, byte> |
| 15 | <FM + 3, CH + 2, CE, LUN, plane, block, page, byte> |
| 16 | <FM + 3, CH + 3, CE, LUN, plane, block, page, byte> |

Referring to Table 1, the physical address corresponding to physical location number 1 corresponds to the first physical location in the RAID grid. All elements in the remaining physical addresses are identical except the elements corresponding the IFDs—namely, FM and CH. As shown in Table 1, the values of these elements are incremented to obtain physical addresses that span the two IFDs. In particular, because the size of each dimension is four, the values of FM vary from FM to FM+3 and the values of CH vary from CH to CH+3. While the above example shows the various elements in the physical address being incremented using whole numbers, the elements may be incremented using other values without departing from the invention. Those skilled in the art will appreciate that the physical addresses for the grid locations in a given stripe do not need to be sequential (e.g., as shown in Table 1); rather, one or more processes implementing the invention need only to be able to ascertain the physical addresses using some deterministic mechanism such that physical addresses may be determined without reference to external data.

Continuing with FIG. 7A, in step 706, the number of parity values in each dimension is determined. For example, a determination is made about whether each dimension has one, two, or three parity values. Those skilled in the art will appreciate that the invention is not limited to three parity values per dimension. Further, those skilled in the art will appreciate that the number of parity values does not need to be the same for each dimension.

In step 708, an IFD is selected. In step 710, a row or column of physical locations along the IFD (selected in Step 708) with the least number of bad physical locations relative to all other rows or columns of physical locations in the IFD is identified. In step 712, the row/column identified in Step 710 is selected to store the parity values in the RAID grid. (See FIG. 8A)

In step 714, a determination is made about whether additional rows/columns to store parity values are required for the IFD. More specifically, if the IFD requires more than one parity value per row/column (as specified in Step 706), the process proceeds to Step 710; otherwise, the process proceeds to Step 716. In step 716, a determination is made about whether any rows/columns to store parity values are required for other IFDs in the RAID grid (as specified in Step 706). If rows/columns to store parity values are required for other IFDs, the process proceeds to Step 708; otherwise the process ends. At this stage, the RAID grid is ready to be populated with pages (see FIG. 5A-5C).

Figure 7B:
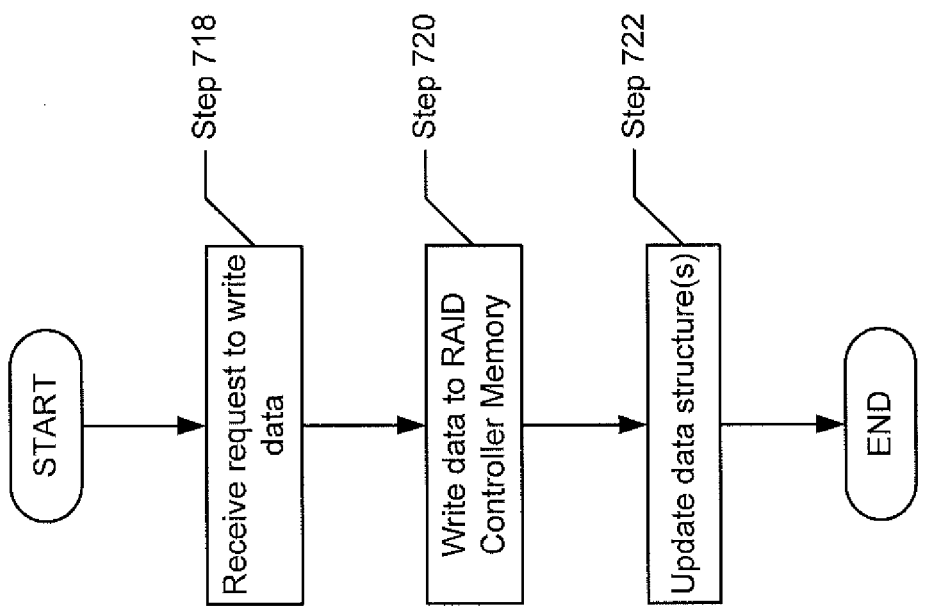

Referring to FIG. 7B, in step 718, a request to write data is received from the client. In one embodiment of the invention, the request includes the <object, offset> (i.e., logical address) that identifies the data from the perspective of the client. In step 720, the RAID controller, in response to the request, writes the data to a location in the RAID controller memory.

In step 722, the RAID controller updates one or more of the data structures (see FIG. 6). More specifically, in one embodiment of the invention, the RAID controller may (i) select a physical address corresponding to a physical location in the storage array in which to write the data received from the client and (ii) create a mapping between the <object, offset> for the data and the selected physical address.

Figure 7C:
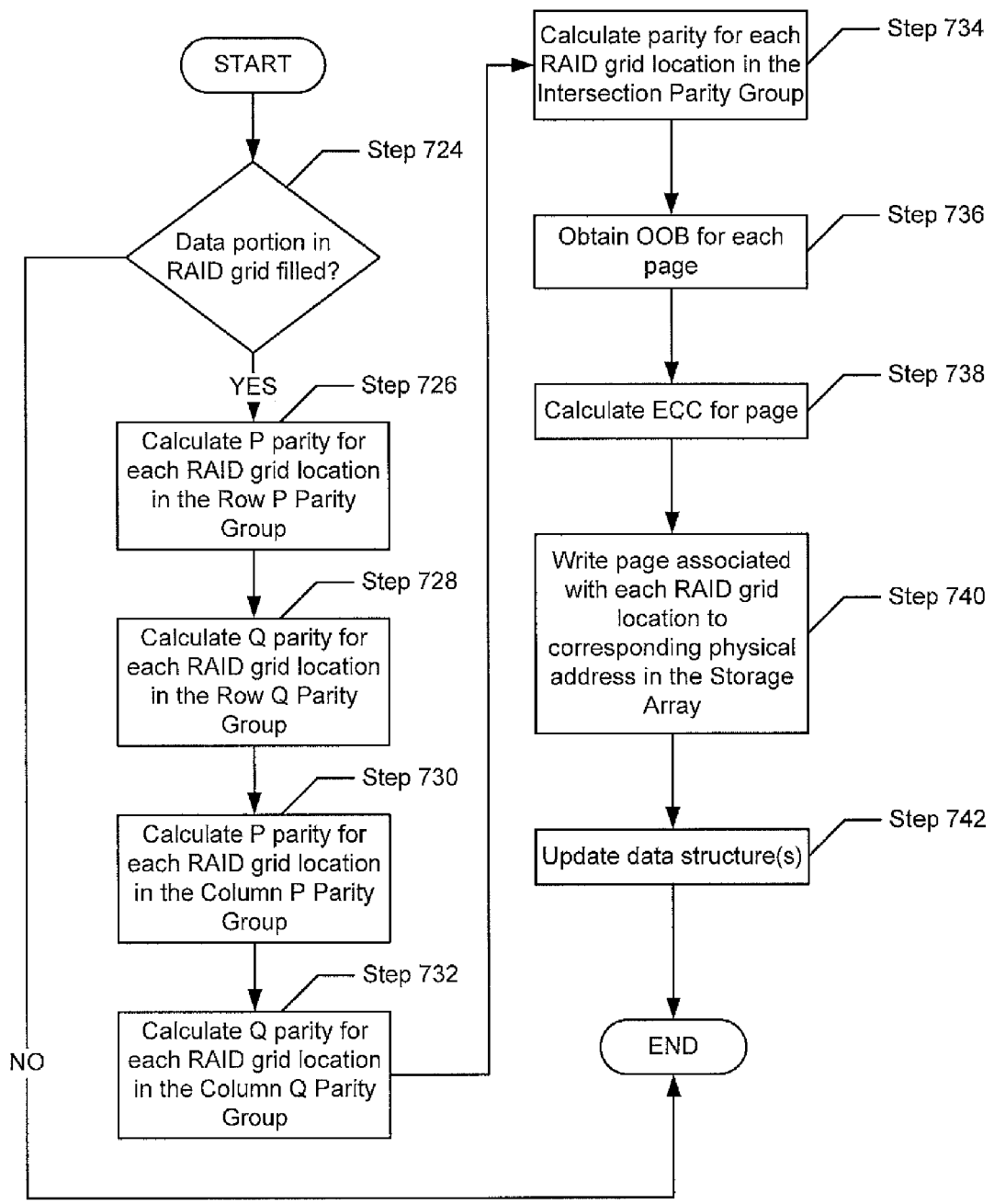

In one embodiment of the invention, FIG. 7C shows a method for writing a RAID grid to the storage array in accordance with one or more embodiments of the invention. Referring to FIG. 7C, in step 724, a determination is made about whether a data grid within a given RAID grid (e.g., 202 in FIG. 2) is filled. In one embodiment of the invention, this determination is made using one or more of the data structures described with respect to FIG. 6. If the data grid within a given RAID grid is filled, the process proceeds to step 726; otherwise, the process ends.

In step 726, the P parity is calculated for each RAID grid location in the Row P parity group (e.g., 204 in FIG. 2) using the appropriate values from RAID grid locations in the data grid. In step 728, the Q parity is calculated for each RAID grid location in the Row Q parity group (e.g., 206 in FIG. 2) using the appropriate values from RAID grid locations in the data grid. In step 730, the P parity is calculated for each RAID grid location in the Column P parity group (e.g., 208 in FIG. 2) using the appropriate values from RAID grid locations in the data grid. In step 732, the Q parity is calculated for each RAID grid location in the Column Q parity group (e.g., 210 in FIG. 2) using the appropriate values from RAID grid locations in the data grid.

In step 734, the parity values for all RAID grid locations in the intersection parity group (e.g., 212 in FIG. 2) are calculated using the appropriate values from RAID grid locations in one or more of the Row P parity group (e.g., 204 in FIG. 2), Row Q parity group (e.g., 206 in FIG. 2), Column P parity group (e.g., 208 in FIG. 2), and Column Q parity group (e.g., 210 in FIG. 2).

In Step 736, the OOB for each page to be written to the persistent storage is obtained and appended to the user data (as defined in FIG. 5A). In one embodiment of the invention, the information for the OOB is obtained or otherwise provided by the RAID controller. Once all the OOB data (excluding the checksum) is obtained, the checksum is calculated using the OOB data and added to the OOB (see FIG. 5B). At this stage, the page (which includes the user data and OOB) is ready to be written to the specified physical address in the persistent storage.

In Step 738, ECC is calculated for the page. The ECC is calculated using the user data and the OOB as input. In one embodiment of the invention, the ECC is calculated by the RAID controller and appended to the page (see FIG. 5A). Alternatively, the page (excluding the ECC) may be sent to a storage module controller. Upon receipt of the page (excluding the ECC), the storage module controller may calculate the ECC and append it to the page prior to writing the page (with the ECC) to persistent storage.

In step 740, the page (including the ECC) associated with each RAID grid location for the RAID grid is written to the appropriate physical address in the storage array. In one embodiment of the invention, the physical address in which to write the page for each of the RAID grid locations is obtained from the one or more of the data structures described with respect to FIG. 6. In step 742, one or more data structures described with respect to FIG. 6 are updated to reflect that the RAID grid has been written to the storage array.

Figure 7D:
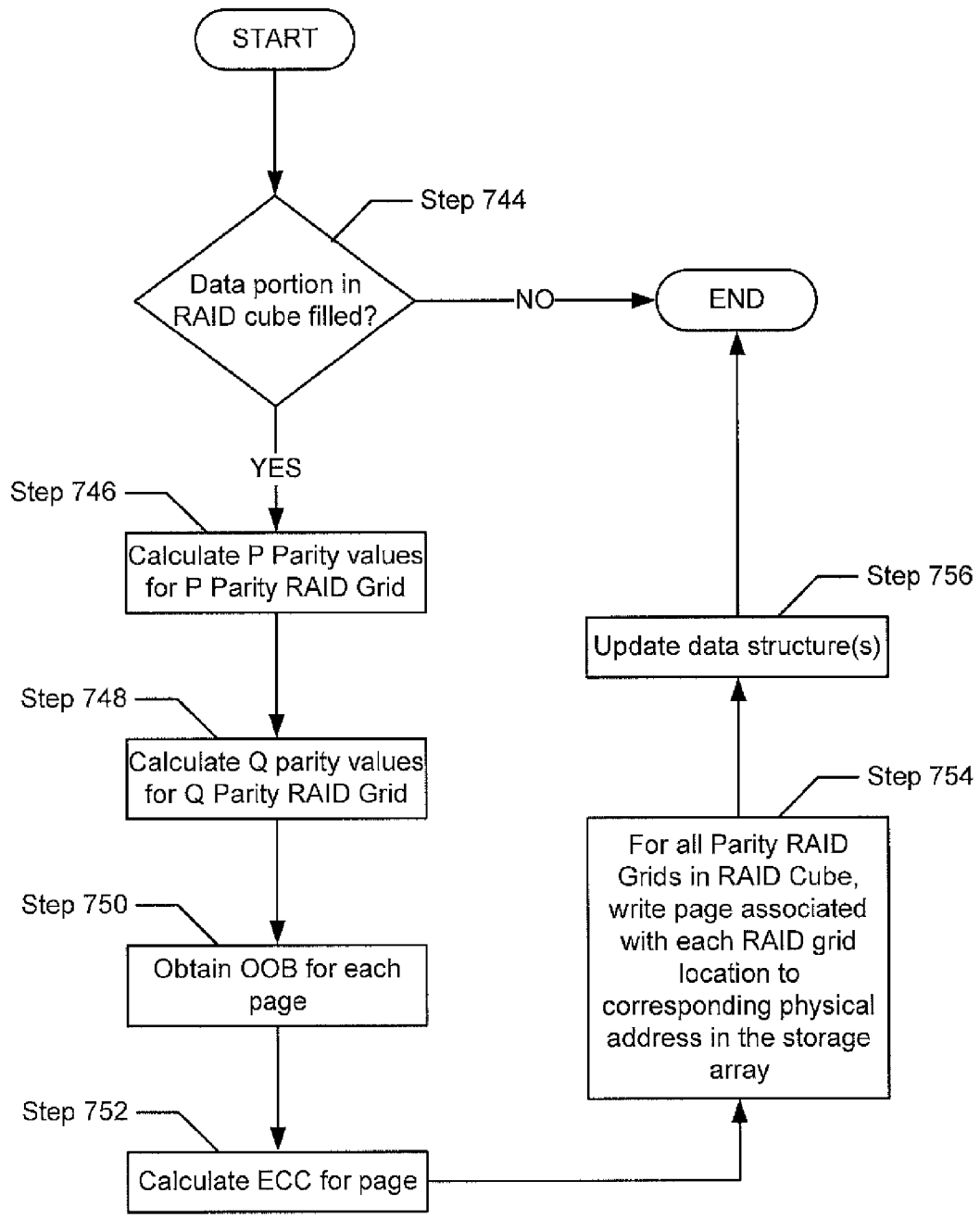

In one embodiment of the invention, if the RAID controller is implementing a 3D RAID scheme, then the RAID controller may perform the method shown in FIG. 7D. Referring to FIG. 7D, in step 744, a determination is made about whether a data portion of the RAID cube is filled. If the data portion of the RAID cube is filled, the process proceeds to Step 746; otherwise the process ends. In one embodiment of the invention, this determination is made using one or more of the data structures described with respect to FIG. 6.

In step 746, the P parity value for each RAID grid location in the P parity RAID grid (e.g., 312 in FIG. 3) is calculated. In one embodiment of the invention, the parity value for each of the RAID grid locations is calculated using one value obtained from each of the RAID grids in the data portion (see e.g., FIG. 4B) of the RAID cube.

In step 748, the Q parity value for each RAID grid location in the Q parity RAID grid (e.g., 314 in FIG. 3) is calculated. In one embodiment of the invention, the parity value for each of the RAID grid locations is calculated using one value obtained from each of the RAID grids in the data portion (see e.g., FIG. 4C) of the RAID cube.

In Step 750, the OOB for each page to be written to the persistent storage is obtained and appended to the user data (as defined in FIG. 5A). In one embodiment of the invention, the information for the OOB is obtained or otherwise provided by the RAID controller. Once all the OOB data (excluding the checksum) is obtained, the checksum is calculated using the OOB data and added to the OOB (see FIG. 5B). At this stage the page (which includes the user data and OOB) is ready to be written to the specified physical address in the persistent storage.

In Step 752, ECC is calculated for the page. The ECC is calculated using the user data and the OOB as input. In one embodiment of the invention, the ECC is calculated by the RAID controller and appended to the page (see FIG. 5A). Alternatively, the page (excluding the ECC) may be sent to a storage module controller. Upon receipt of the page (excluding the ECC), the storage module controller may calculate the ECC and append it to the page prior to writing the page (with the ECC) to persistent storage.

In step 754, the page (including the ECC) associated with each RAID grid location in the Parity RAID grids (e.g., P Parity RAID Grid and Q Parity RAID Grid) is written to the appropriate physical address in the storage array. In one embodiment of the invention, the physical address in which to write the page for each of the RAID grid locations is obtained from the one or more of the data structures described with respect to FIG. 6. In step 756, one or more data structures described with respect to FIG. 6 are updated to reflect that the RAID cube has been written to the storage array.

Figure 8A:
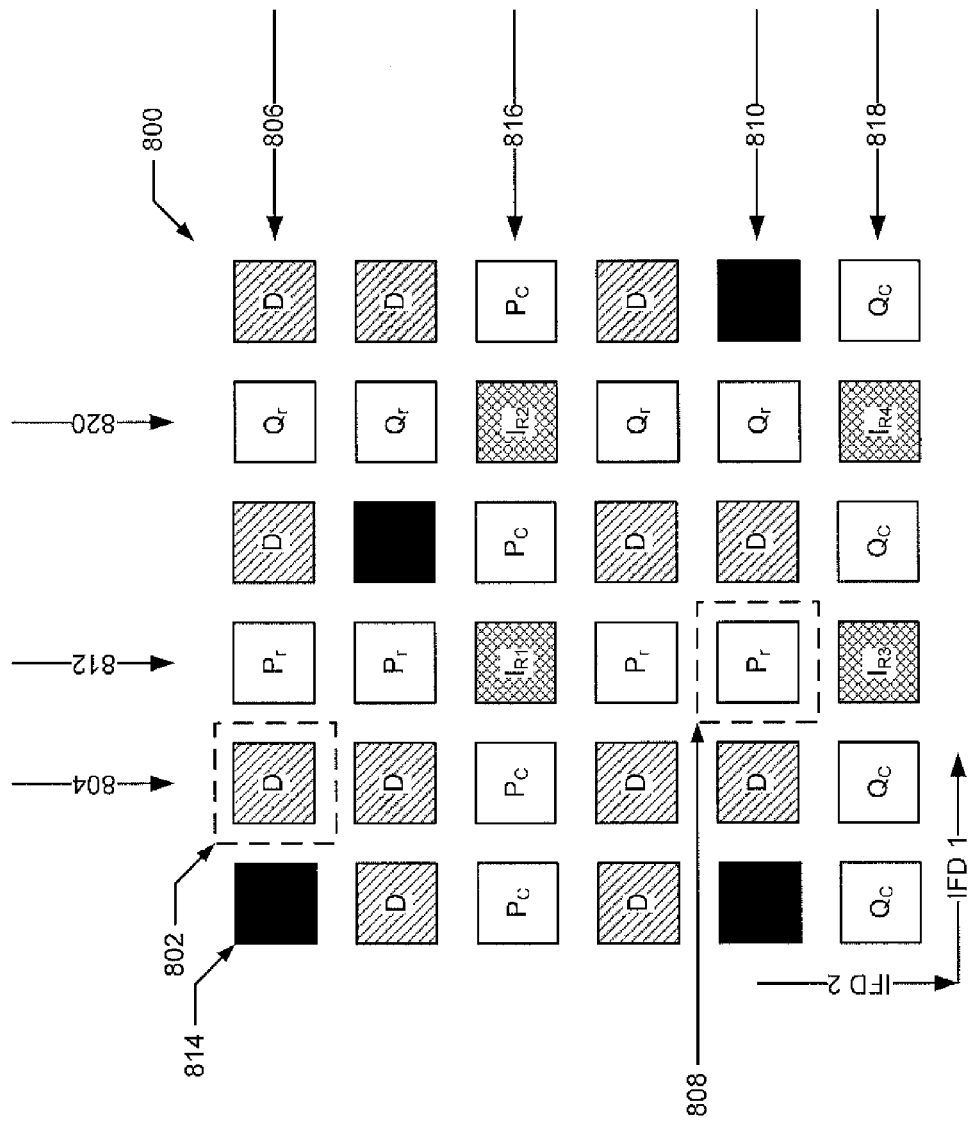
FIGS. 8A-8C show an example in accordance with one or more embodiments of the invention.
Figures 8B, 8C:
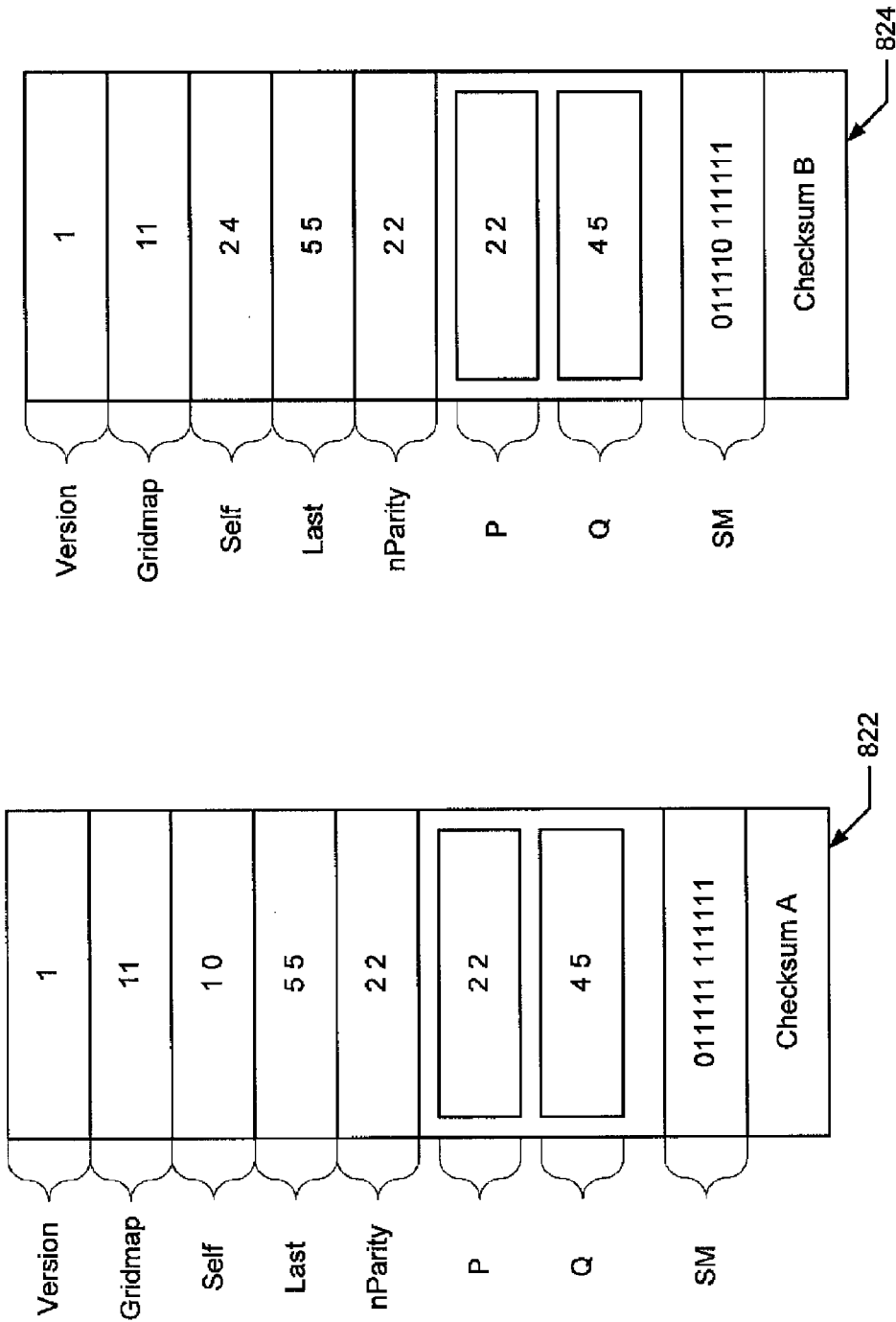

FIGS. 8A-8C show an example RAID grid in accordance with one or more embodiments of the invention. The example is not intended to limit the scope of the invention.

Referring to FIG. 8A, FIG. 8A includes a RAID grid (800). The RAID grid (800) is a 6×6 grid with two parity values in each dimension. The RAID grid locations that include data from a client are denoted with a "D", the RAID grid locations that include parity values are denoted as P, Q, or I, and the RAID grid locations that are associated with bad physical locations are denoted as solid black squares.

For purposes of this example, assume that physical location (814) is a reference RAID grid location. Accordingly, the location of the reference RAID grid location is <0,0>. Finally, for purposes of this example, the IFDs are flash module (FM) and Channel (CH).

Turning to the example, rows (816) and (818) are selected (using the method shown in FIG. 7A) as parity rows and columns (812) and (820) are selected as parity columns. More specifically, the RAID grid (800) includes six rows, three of which do not include any bad physical locations. Accordingly, any two of the aforementioned three rows may be selected to store the parity values across IFD 1. Similarly, the RAID grid (800) includes six columns, three of which do not include any bad physical locations. Accordingly, any two of the aforementioned three columns may be selected to store the parity values across IFD 2. The RAID grid locations corresponding to the intersection parity group are located at the intersection of the various rows and columns in which parity values are stored.

Based on the above information, the OOB for the pages stored in RAID grid locations (804) and (808) includes the information shown in FIGS. 8B and 8C. Turning to FIG. 8B, FIG. 8B shows the OOB (822) for the page stored in RAID grid location (802). Specifically, the version of the OOB is 1, which indicates OOB format number 1. Further, the gridmap denotes 11 which corresponds to an encoded bitmap denoting that FM and CH are the two IFDs. With respect to grid geometry, (i) the self field includes <1, 0> indicating that the page stored in RAID grid location (802) is in column 1, row 0 of the RAID grid (800), (ii) the last field specifies <5,5> indicating that the RAID grid is 6×6 (where the numbering in each dimension starts at zero), (iii) the nparity field specifies <2,2> denoting that each dimension includes two parity values, (iv) the P field (which is one of the parity location fields) specifies <2, 2> indicating that the row P parity group is in the third column (812) of the RAID grid and the column P parity group is in the third row (816) of the RAID grid, (v) the Q field (which is one of the parity location fields) specifies <4, 5> indicating that the row Q parity group is in the fifth column (820) of the RAID grid and the column Q parity group is in the sixth row (818) of the RAID grid. Finally, the stripe membership for the page in RAID grid location (802) is <011111, 111111> which includes the stripe membership along row (806) and column (804) with 0 denoting that the physical location corresponding to RAID grid location (814) is bad.

FIG. 8C shows the OOB (824) for the page stored in RAID grid location (808). Specifically, the version of the OOB is 1, which indicates OOB format number 1. Further, the gridmap denotes 11 which corresponds to an encoded bitmap denoting that FM and CH are the two IFDs. With respect to grid geometry, (i) the self field include <2, 4> indicating that the page stored in RAID grid location (808) is in column 2, row 4 of the RAID grid (800), (ii) the last field specifies <5,5> indicating that the RAID grid is 6×6 (where the number starts at zero), (iii) the nparity field specifies <2,2> denoting that each dimension includes two parity values, (iv) the P field (which is one of the parity location fields) specifies <2, 2> indicating that the row P parity group is in the third column (812) of the RAID grid and the column P parity group is in the third row (816) of the RAID grid, (v) the Q field (which is one of the parity location fields) specifies <4, 5> indicating that the row Q parity group is in the fifth column (820) of the RAID grid and the column Q parity group is in the sixth row (818) of the RAID grid. Finally, the stripe membership for the page in RAID grid location (808) is <011110, 111111> which includes the stripe membership along row (810) and column (812) with 0 denoting that the physical locations corresponding to RAID grid locations at both ends of row (810) are bad.

Figure 9A:
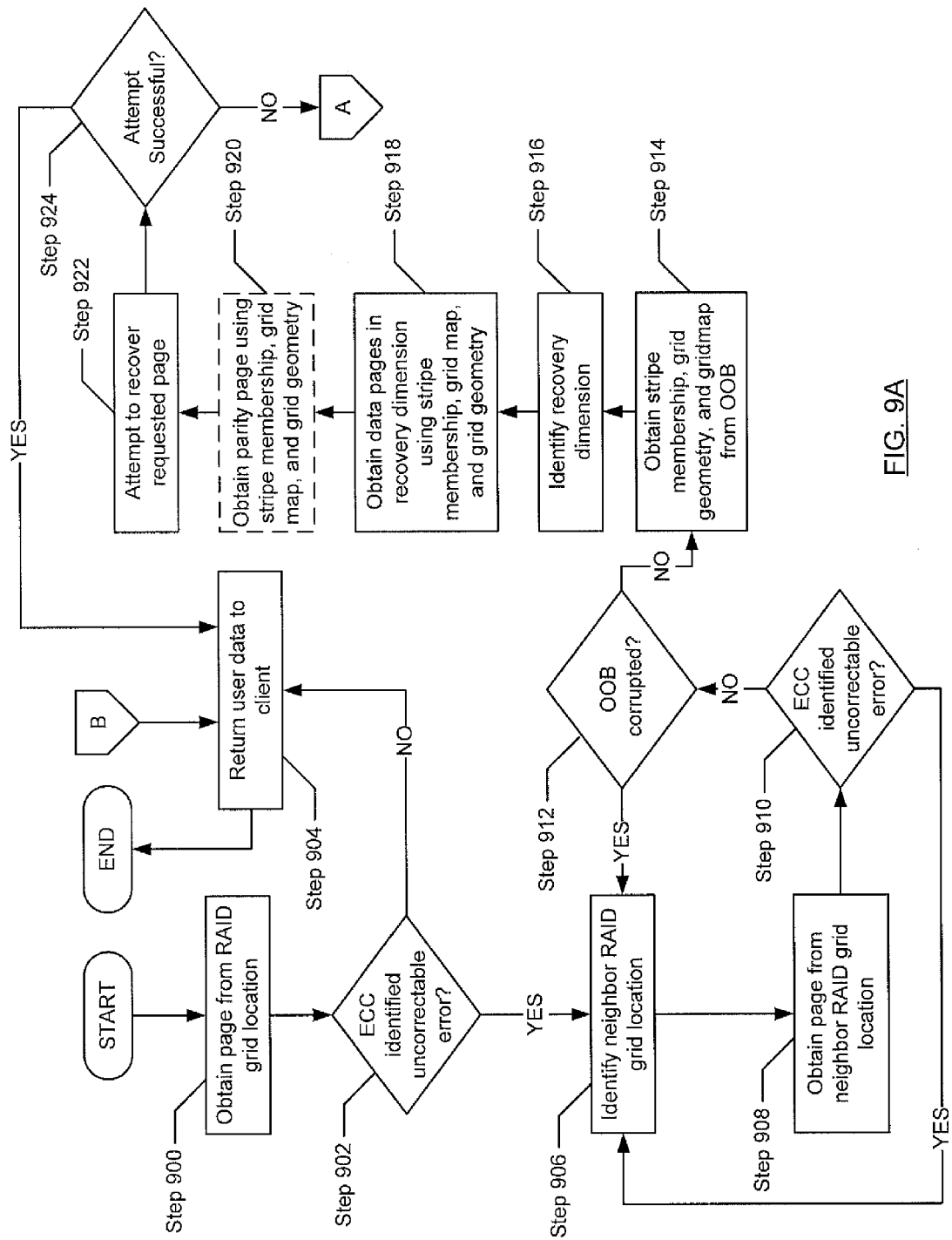
FIGS. 9A-9B show a flow chart in accordance with one or more embodiments of the invention.
Figure 9B:
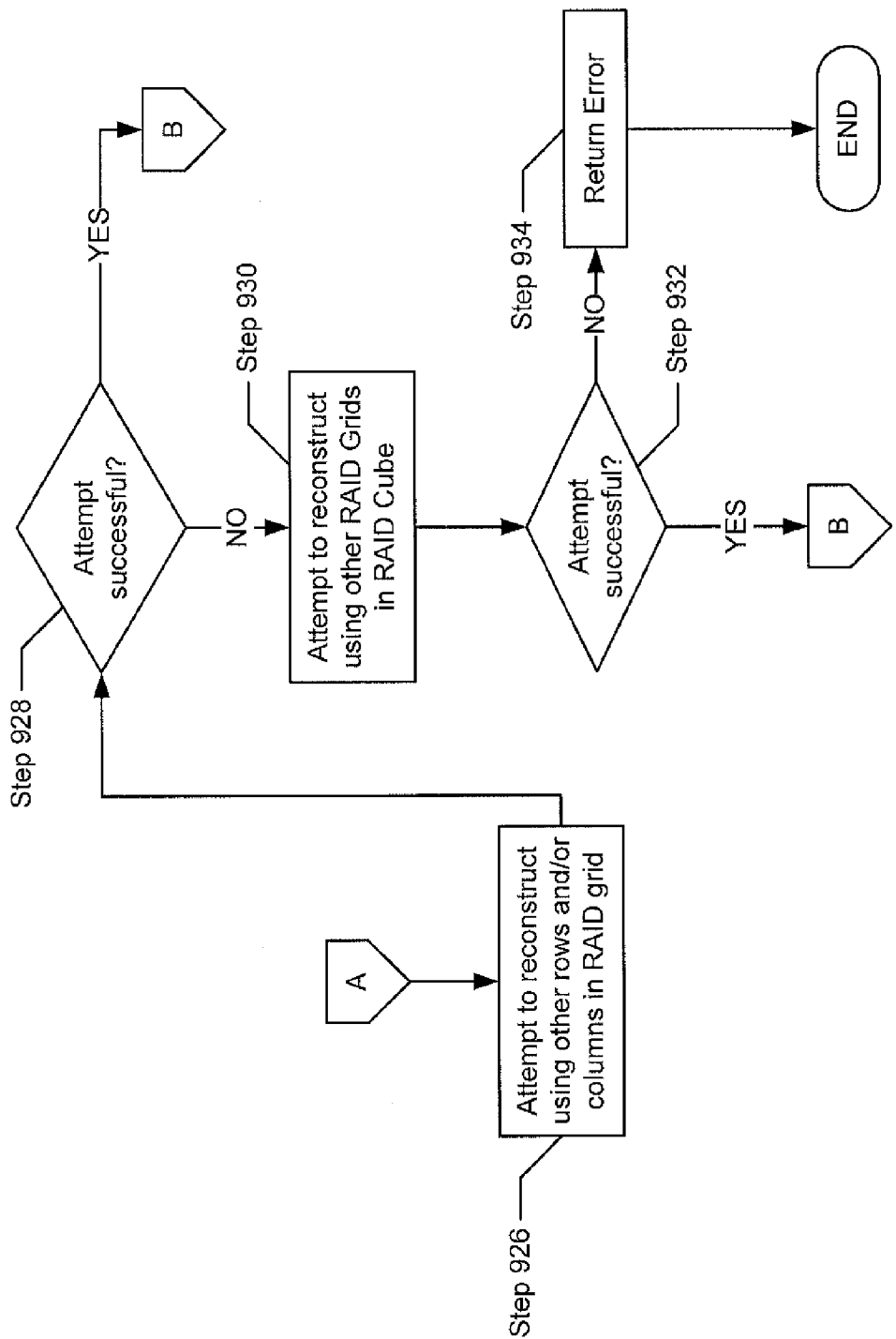

FIGS. 9A-9B. show a flow chart in accordance with one or more embodiments of the invention. More specifically, FIGS. 9A-9B show a method for obtaining data from the storage array in accordance with one or more embodiments of the invention.

While the various steps in the flowchart are presented and described sequentially, one of ordinary skill will appreciate that some or all of the steps may be executed in different orders, may be combined or omitted, and some or all of the steps may be executed in parallel.

In step 900, a page is obtained from a RAID grid location. In one embodiment of the invention, the page is obtained in response to a request from a client. In one embodiment of the invention, the request may specify an <object, offset> and the RAID controller may use one or more of the data structures described with respect to FIG. 6 to determine the physical address corresponding to the RAID grid location in the storage array at which the requested page is stored. The RAID controller may subsequently obtain the page that includes requested data from the storage array.

In step 902, a determination is made about whether the ECC in the page obtained in Step 900 indicates that the page includes an uncorrectable error. As discussed above, the ECC may be used to both detect and, in certain instances, correct errors in the page. In one embodiment of the invention, the RAID controller or storage module controller (if present) may use the ECC to determine whether the page includes an uncorrectable error. If the page includes an uncorrectable error, the process proceeds to step 906; otherwise the process proceeds to step 904. In step 904, the user data is extracted from the page and provided to the client.

At this stage, because the page obtained in step 900 is corrupted, an attempt is made to reconstruct the page. In particular, the process proceeds to Step 906. In step 906, a neighbor RAID grid location is identified. In one embodiment of the invention, the neighbor RAID grid location corresponds to a RAID grid location along one of the IFDs in the RAID grid that is in the same row or column as the RAID grid location from the page that was obtained in Step 900. In one embodiment of the invention, the RAID controller determines the neighbor RAID grid location.

In step 908, the page stored in the neighbor RAID grid location is obtained from the storage array.

In step 910, a determination is made about whether the ECC in the page obtained in Step 908 indicates that the page includes an uncorrectable error. As discussed above, the ECC may be used to both detect and, in certain instances, correct errors in the page. In one embodiment of the invention, the RAID controller or storage module controller (if present) may use the ECC to determine whether the page includes an uncorrectable error. If the page includes an uncorrectable error, the process proceeds to step 906; otherwise the process proceeds to step 912.

In step 912, a determination is made about whether the OOB is corrupted. More specifically, the OOB is extracted from the page obtained in step 908. The checksum for the OOB is subsequently extracted from the OOB. A checksum function is applied to the remaining data in the OOB to generate a calculated checksum. The calculated checksum is compared with the extracted checksum. If the two checksums match, the OOB is not corrupted and the process proceeds to step 914; otherwise the process proceeds to Step 906.

In step 914, the stripe membership, grid map, and grid geometry are obtained from the OOB.

In step 916, the recovery dimension is identified. For example, if the neighbor RAID grid location is in the same row as the RAID grid location used in Step 900, then the recovery dimension is along the row.

In step 918, the data pages (i.e., pages that do not include parity data) are obtained from the storage array. More specifically, the stripe membership bitmap for the recovery dimension (determined in step 916) is used to identify which RAID grid locations in the recovery dimension include non-bad pages. Further, the parity locations in the grid geometry are used to determine which of the RAID grid locations include parity values and which of the RAID grid locations include data from the client. Based on the aforementioned information, the relative location of the data pages in the recovery dimension may be determined. Using the relative location of each the data pages, the gridmap, the information in the self field of the OOB, and the physical address of the neighbor RAID grid location, the physical address for each of the RAID grid locations that include data pages may be determined. Once the physical addresses are known, the corresponding data pages are obtained. If the recovery dimension includes bad physical locations (as specified by the stripe membership), no attempt is made to obtain pages from bad physical pages.

Optionally, in step 920, one or more parity pages (i.e., a page that includes a parity value (e.g., P parity value or Q parity value)) in the recovery dimension is obtained. The parity page may be obtained in a manner similar to that described with respect to data pages in step 918. In one embodiment of the invention, if the neighbor RAID grid location includes a parity page, then step 920 may not be required.

In step 922, recovery of the requested page (i.e., the page obtained in step 900) is attempted using the data pages and parity page(s) obtained in the prior steps. Those skilled in the art will appreciate that because pages are not obtained from bad physical locations, such pages are not required for the recovery of the requested page.

In step 924, a determination is made about whether the reconstruction attempt in step 922 was successful. In one embodiment of the invention, the RAID controller may implement any known method (e.g., checksums) for determining whether the reconstruction attempt was successful. If the reconstruction attempt in step 922 was successful, the process proceeds to step 904; otherwise the process proceeds to step 926.

In Step 926, the RAID controller attempts to reconstruct the page using the same process as described above with RAID grid locations in other rows and/or columns the RAID grid. In step 928, a determination is made about whether the reconstruction attempt in step 926 was successful. In one embodiment of the invention, the RAID controller may implement any known method (e.g., checksums) for determining whether the reconstruction attempt was successful. If the reconstruction attempt in step 926 was successful, the process proceeds to step 904; otherwise the process proceeds to step 930.

In step 930, the RAID controller attempts to reconstruct the page using the same process as described above with other RAID grids in the RAID cube. In step 932, a determination is made about whether the reconstruction attempt in step 930 was successful. In one embodiment of the invention, the RAID controller may implement any known method (e.g., checksums) for determining whether the reconstruction attempt was successful. If the reconstruction attempt in step 932 was successful, the process proceeds to step 904; otherwise the process proceeds to step 934. In step 934, the RAID controller returns an error to the client, which indicates that the requested data cannot be retrieved from the storage array by the RAID controller.

Those skilled in the art will appreciate that reconstructing the data using the other RAID grids in the RAID cube only occurs in the event that the RAID controller is implementing a 3D RAID scheme.

FIGS. 10A-10D show an example in accordance with one or more embodiments of the invention. The example is not intended to limit the scope of the invention.

Figure 10A:
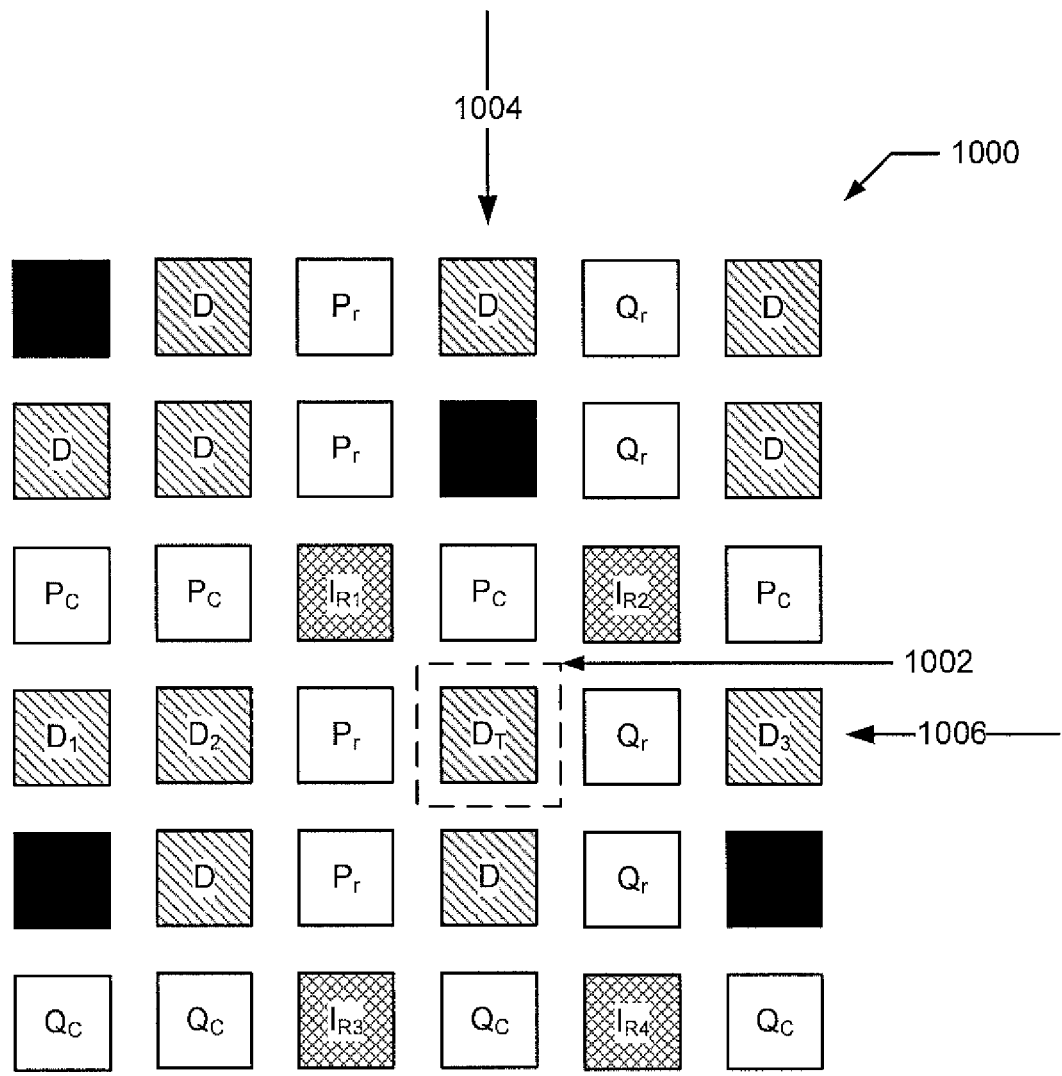
FIGS. 10A-10D show an example in accordance with one or more embodiments of the invention.

Referring to FIG. 10A, consider a scenario is which the storage array includes a RAID grid (1000) and that a client requests data ($D_T$) located in the page stored at RAID grid location (1002). In response to the client's request, the RAID controller (not shown) obtains the page stored at RAID grid location (1002) and subsequently determines using ECC in the page that the page is corrupted.

Figure 10C:
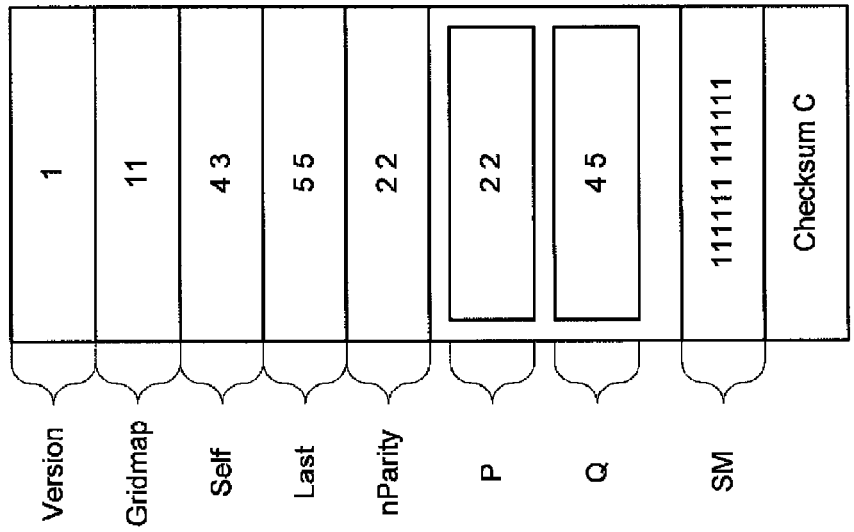
Figure 10B:
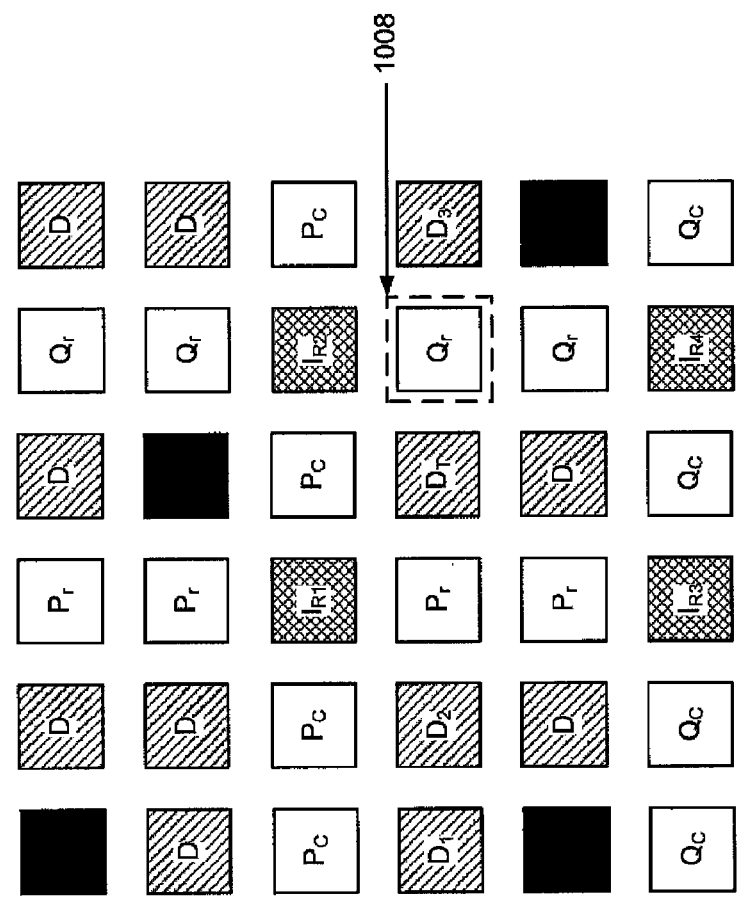

At this stage, the RAID controller attempts to reconstruct the page stored at RAID grid location (1002). As discussed above, the RAID grid controller selects a neighbor RAID grid location. In this example, the RAID grid controller may select a neighbor RAID grid location from row (1006) or column (1004). As shown in FIG. 10B, the RAID grid controller selects RAID grid location (1008) as the neighbor RAID grid location.

The RAID controller subsequently obtains the page at RAID grid location (1008), determines that the page at RAID grid location (1004) is not corrupted (e.g., using the ECC stored with the page), and subsequently extracts the OOB from the page located at RAID grid location (1004). FIG. 10C shows the OOB for the page obtained RAID grid location (1004).

Figure 10D:
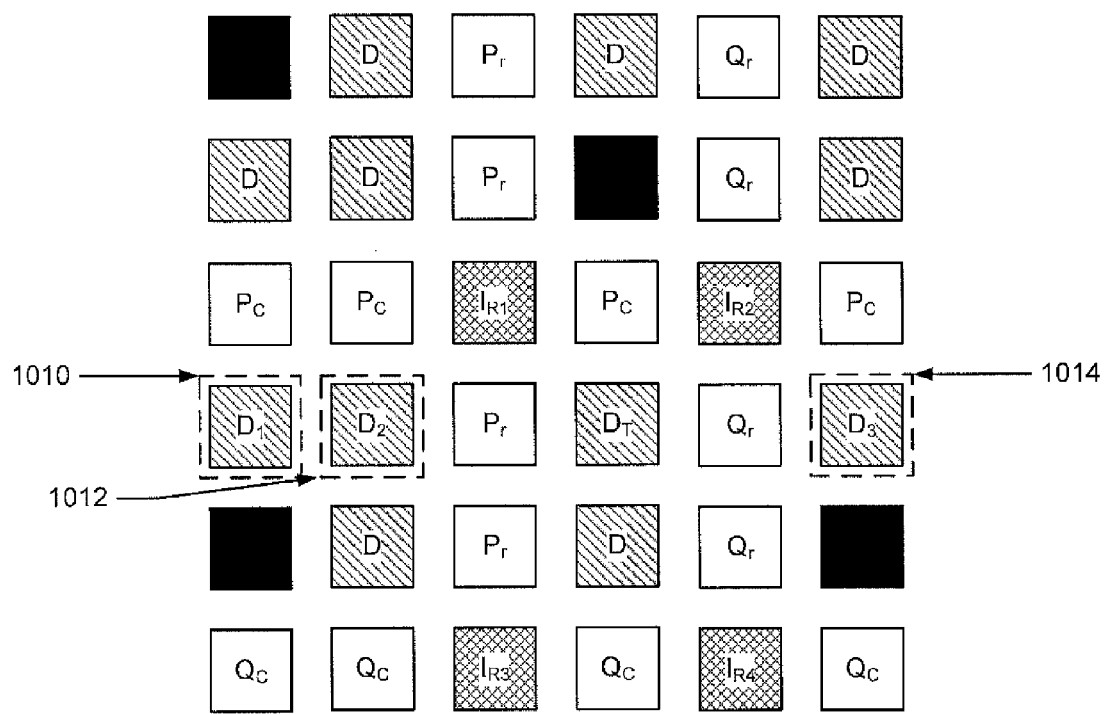

Using the gridmap, the RAID controller determines that the IFD 1 is FM and IFD 2 is CH. Further, the RAID controller determines that the recovery dimension is along row (which corresponds to IFD 1) (1006 in FIG. 10A). The stripe membership along IFD 1 indicates that there are no bad physical locations in the recovery dimension. Further, the P field indicates that the P parity value for row (1006) are located at position 2 in the row and the Q field indicates that the Q parity value for row (1006) is located at position 4 in the row. Using the above information along with the self field, the RAID grid controller determines that data pages (i.e., pages that do not include parity values) are located at positions 0, 1, and 6. Referring to FIG. 10D, the aforementioned positions correspond to RAID grid location (1010), RAID grid location (1012), and RAID grid location (1014), respectively.

Assuming that the physical address for the RAID grid location (1008) is <FM, CH, CE, LUN, plane, block, page, byte>, the RAID controller determines the physical addresses for the RAID grid locations that include data pages as shown in Table 2.

TABLE 2

| Relative RAID grid location | Physical Address for RAID grid location |
| --- | --- |
| 0 | <FM − 4, CH, CE, LUN, plane, block, page, byte> |
| 1 | <FM − 3, CH, CE, LUN, plane, block, page, byte> |
| 6 | <FM + 1, CH, CE, LUN, plane, block, page, byte> |

The RAID controller subsequently obtains the data pages using the aforementioned addresses. Using the self field and the Q parity field, the RAID controller determines that the page obtained from RAID grid location (1008) includes the Q parity value for row (1006). At this stage, the user data obtained from RAID grid location (1010), RAID grid location (1012), and RAID grid location (1014) along with the Q parity value may be used to reconstruct the page at RAID grid location (1002).

FIGS. 11A-11D show an example in accordance with one or more embodiments of the invention. The example is not intended to limit the scope of the invention. FIGS. 11A-11D include an example that illustrates the iterative reconstruction of various pages in the RAID grid in order to ultimately reconstruct the page requested by the client. While FIGS. 11A-11D focus on the iterative reconstruction aspect of the invention, those skilled in the art will appreciate that obtaining the data pages and parity values to facilitate the iterative reconstruction may be performed at least in accordance with steps 916-922 in FIG. 9A.

Figure 11A:
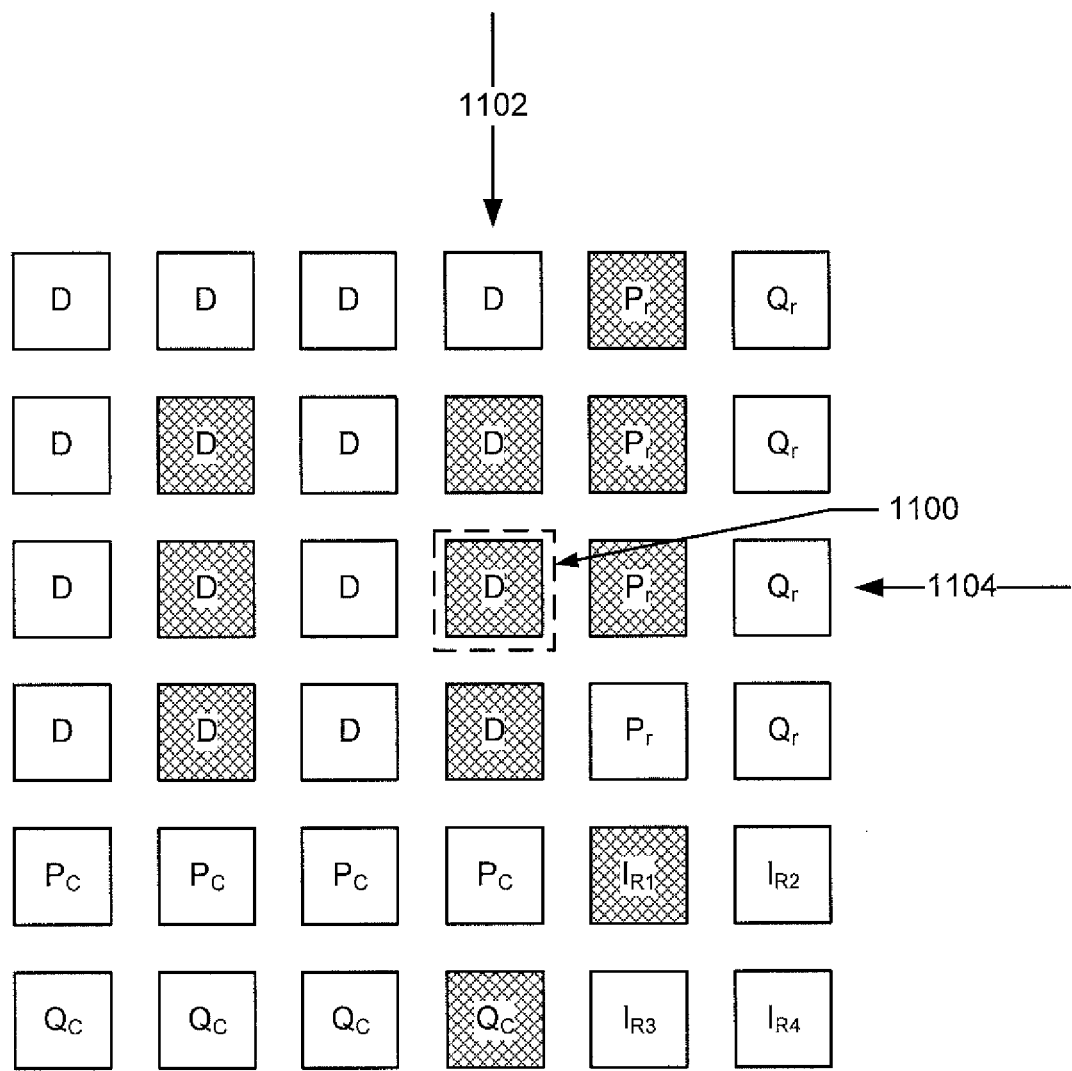
FIGS. 11A-11D show an example in accordance with one or more embodiments of the invention.

Referring to FIG. 11A, consider a scenario in which a client requested data from RAID grid location (1100). However, the data from RAID grid location (1100) is corrupted (as denoted by the shading). The RAID controller first attempts (per steps 900-924 in FIG. 9A) to reconstruct the data in RAID grid location (1100) using data from RAID grid location in row (1104) and/or column (1102). However, because row (1104) and column (1102) each include three RAID grid locations that include corrupted data, the data in RAID grid location (1100) cannot be recovered using only data from row (1104) and/or column (1102). In general, a RAID stripe containing n data pages and m parity pages can recover up to m corrupted or missing pages. In our example, with two parity pages P and Q, each stripe can recover up to two errors.

Figure 11B:
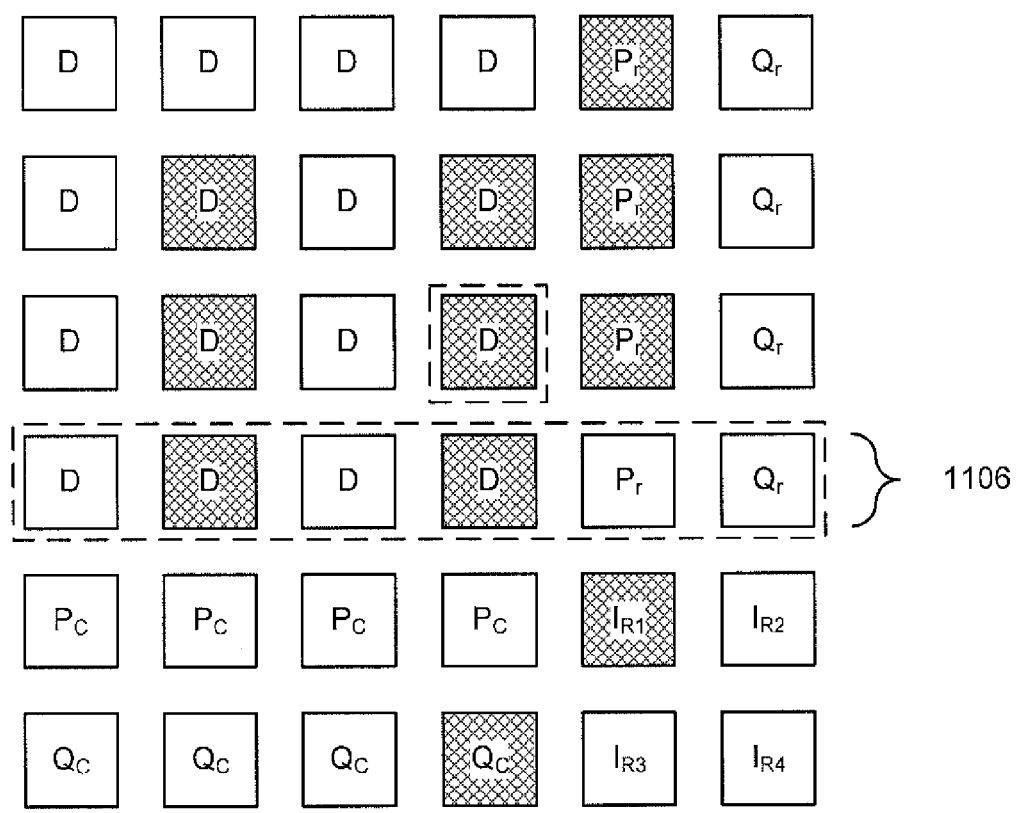
Figure 11C:
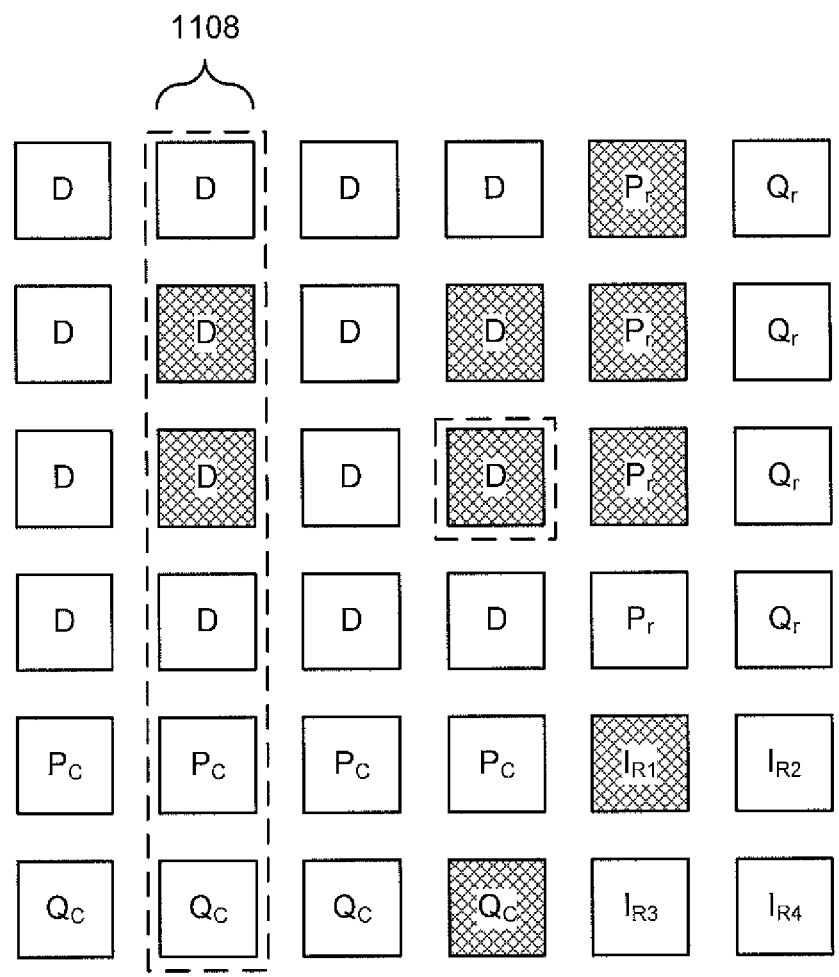
Figure 11D:
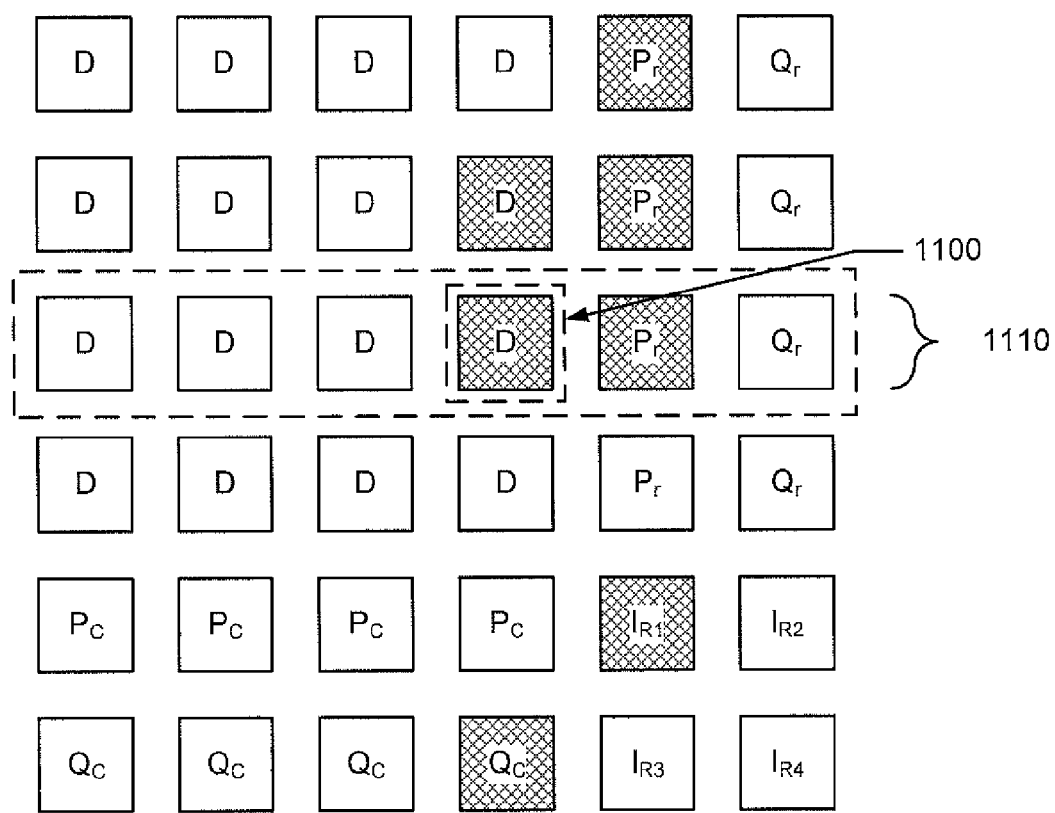

Referring to FIG. 11B, the RAID controller attempts (per step 928 in FIG. 9B) to reconstruct the data in RAID grid location (1100) using data from other RAID grid locations in the RAID grid. In this example, the RAID controller reconstructs all corrupted data in row (1106). Referring to FIG. 11C, based on the reconstruction of the corrupted data in row (1106), the RAID controller is able to reconstruct all corrupted data in column (1108). Finally, referring to FIG. 11D, based on the reconstruction of the corrupted data in column (1108), the RAID controller is able to reconstruct the data in RAID grid location (1100) using the other non-corrupted data in row (1110).

Though not shown in FIGS. 11A-11D, if the data in RAID grid location (1100) could not be constructed using only the data in the RAID grid, the RAID controller would attempt to reconstruct the data in RAID grid location (1100) (per Step 932 in FIG. 9B) using data in other RAID grids within a RAID cube (not shown) if the RAID controller was implementing a 3D RAID scheme.

Those skilled in the art will appreciate that while various examples of the invention have been described with respect to storing data in a storage array along IFDs and/or storing data in NAND flash, embodiments of the invention may be implemented on any multi-dimensional disk array without departing from the invention. For example, one or more embodiments of the invention may be implemented using a two dimensional array of storage devices (magnetic, optical, solid state, or any other type of storage device), where data for each RAID grid location in a RAID grid is stored on a separate disk.

Further, in one embodiment of the invention, in the event that the RAID controller is implementing a 3D RAID scheme using a three dimensional array of disks, the RAID controller may store data for each of the RAID grid locations using the following n-tuple: <disk x, disk y, disk z, logical block address (LBA) a>, where x, y, and z are the dimensions of the disk array.

The above examples for implementing embodiments of the invention using a two-dimensional disk array are not intended to limit the scope of the invention.

Those skilled in the art will appreciate that while the invention has been described with respect to a 2D RAID scheme and a 3D RAID scheme, embodiments of the invention may be extended to any multi-dimensional RAID scheme.

One or more embodiments of the invention may be implemented using instructions executed by one or more processors in the system. Further, such instructions may correspond to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for storing data comprising:
receiving a request to write data;
in response the request, selecting a first RAID grid location in a RAID grid to write the data;
determining a first physical address in persistent storage corresponding to the first RAID grid location;
generating a first page comprising the data and first out-of-band (OOB), wherein the first OOB comprises a first grid geometry for the RAID grid, and a first stripe membership for the page within the RAID grid; and
writing the first page to a first physical location in persistent storage corresponding to the first physical address.

2. The method of claim 1, further comprising:
calculating a parity value of the RAID grid using the data;
selecting a second RAID grid location in the RAID grid to write the parity value;

generating a second page comprising the parity value and a second OOB, wherein the second OOB comprises a second grid geometry and a second stripe membership;

determining a second physical address in persistent storage corresponding to the second RAID grid location; and writing the second page to a second physical location in persistent storage corresponding to the second physical address.

3. The method of claim 2, wherein the RAID grid comprises a parity row, wherein the second RAID grid location is in the parity row.

4. The method of claim 3, further comprising:
prior to receiving the request to write the data:
analyzing a number of bad physical locations in each of a plurality of potential locations within the RAID grid; and
selecting one of the plurality of potential locations as a location of the parity row, wherein the selected one of the plurality of potential locations comprises a least number of bad physical locations relative to the other plurality of potential locations.

5. The method of claim 2, wherein the first stripe membership comprises a stripe membership for a first dimension and a stripe membership for a second dimension in the RAID grid, wherein the second stripe membership comprises the stripe membership for the first dimension.

6. The method of claim 5, wherein the first page is in a first row in the RAID grid, wherein the first stripe membership indicates which physical locations in the persistent storage corresponding to the first row are bad.

7. The method of claim 2, wherein the first grid geometry comprises a parity location in the RAID grid and wherein the second grid geometry comprises the parity location in the RAID grid.

8. The method of claim 2, wherein the parity value comprises at least one selected from a group consisting of a P parity value, a Q parity value, and an intersection parity value.

9. The method of claim 1, wherein the first stripe membership is a bitmap.

10. The method of claim 1, wherein the OOB further comprises a gridmap and wherein the gridmap identifies a first independent fault domain (IFD) corresponding to a first dimension of the RAID grid and a second IFD corresponding to a second dimension of the RAID grid.

11. The method of claim 10, wherein the first IFD is a storage module and the second IFD is a channel.

12. The method of claim 10, wherein the first physical location in the persistent storage is specified at least, in part, using the first IFD and the second IFD.

13. The method of claim 1, wherein the first grid geometry comprises a self field specifying a relative location of the first page in the RAID grid to a reference RAID grid location in the RAID grid.

14. The method of claim 1, wherein the first grid geometry comprises a last field specifying a first size of a first dimension of the RAID grid and a second size of a second dimension of the RAID grid.

15. The method of claim 1, wherein the first grid geometry comprises an nparity field specifying a first number of parity values in a first dimension of the RAID grid.

16. The method of claim 15, wherein the nparity field further specifies a second number of parity values in a second dimension of the RAID grid.

17. The method of claim 1, wherein the first OOB comprises a version field corresponding to a format of the OOB.

18. The method of claim 1, wherein the first OOB comprises a checksum calculated using all data in the first OOB.

19. A method for reconstructing data, comprising:
receiving a request for first data;
obtaining the first page comprising the data, wherein the first page is obtained from a first physical location in persistent storage and wherein the first physical location is associated with a first physical address and a first RAID grid location in a RAID grid;
making a determination that the first page is one selected from a group consisting of corrupted and not obtained;
based on the determination:
identifying a neighbor RAID grid location of the first RAID grid location in the RAID grid, wherein the RAID grid comprises a row, wherein the first RAID grid location and the neighbor grid location are in the row;
obtaining a second page from the neighbor RAID grid location;
obtaining out-of-band (OOB) data from the second page, wherein the OOB comprises a gridmap for the RAID grid, grid geometry for the RAID grid, and stripe membership for the second page within the RAID grid;
identifying RAID grid locations within the row comprising data pages using the grid geometry and the stripe membership;
obtaining the data pages within the row using the gridmap and the grid geometry;
identifying a RAID grid location in the row comprising a parity value using the grid geometry and the stripe membership;
obtaining the parity value within the row using the gridmap and the grid geometry;
reconstructing the first page using the data pages and the parity value to obtain a reconstructed page;
obtaining the data from the constructed page; and
providing the reconstructed data to the client.

20. The method of claim 19,
wherein the gridmap identifies a first independent fault domain (IFD) corresponding to a first dimension of the RAID grid and a second IFD corresponding to a second dimension of the RAID grid,
wherein the stripe membership indicates which physical locations in the persistent storage corresponding to the row are bad, and
wherein the grid geometry comprises a parity location in the row and a self field specifying a relative location of the second page in the RAID grid to a reference page in the RAID grid.

* * * * *

UNITED STATES PATENT AND TRADEMARK OFFICE
CERTIFICATE OF CORRECTION

PATENT NO. : 8,464,095 B1
APPLICATION NO. : 13/677623
DATED : June 11, 2013
INVENTOR(S) : Jeffrey S. Bonwick It is certified that error appears in the above-identified patent and that said Letters Patent is hereby corrected as shown below:

In the Claims:

At column 20, claim number 1, line number 59, "band (OOB), wherein the first OOB comprises a first" should read --band (OOB) data, wherein the first OOB data comprises a first--.

At column 21, claim number 2, line number 2, "second OOB, wherein the second OOB comprises a" should read --second OOB data, wherein the second OOB data comprises a--.

At column 21, claim number 10, line number 41, "The method of claim 1, wherein the OOB further" should read --The method of claim 1, wherein the OOB data further--.

At column 22, claim number 17, line number 7, "The method of claim 1, wherein the first OOB comprises" should read --The method of claim 1, wherein the first OOB data comprises--.

At column 22, claim number 17, line number 8, "a version field corresponding to a format of the OOB." should read --a version field corresponding to a format of the first OOB data.--.

At column 22, claim number 18, line number 9, "The method of claim 1, wherein the first OOB comprises" should read --The method of claim 1, wherein the first OOB data comprises--.

At column 22, claim number 18, line number 10, "a checksum calculated using all data in the first OOB." should read --a checksum calculated using all data in the first OOB data.--.

At column 22, claim number 19, line number 28, "wherein the OOB comprises a gridmap for the" should read --wherein the OOB data comprises a gridmap for the--.

Signed and Sealed this
Twenty-eighth Day of October, 2014

Michelle K. Lee
*Deputy Director of the United States Patent and Trademark Office*